United States Patent
Park et al.

(10) Patent No.: US 12,078,827 B2
(45) Date of Patent: *Sep. 3, 2024

(54) COLOR FILTERS AND DEVICES INCLUDING THE SAME

(71) Applicant: SAMSUNG ELECTRONICS CO., LTD., Suwon-si (KR)

(72) Inventors: Shang Hyeun Park, Yongin-si (KR); Tae Gon Kim, Hwaseong-si (KR); Shin Ae Jun, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,268

(22) Filed: Dec. 9, 2021

(65) Prior Publication Data

US 2022/0179140 A1  Jun. 9, 2022

(30) Foreign Application Priority Data

Dec. 9, 2020 (KR) .................... 10-2020-0171345

(51) Int. Cl.
   *G02B 5/20* (2006.01)
   *C01G 9/08* (2006.01)
   (Continued)

(52) U.S. Cl.
   CPC ............ *G02B 5/207* (2013.01); *C01G 9/08* (2013.01); *C01G 15/006* (2013.01); *C09K 11/70* (2013.01);
   (Continued)

(58) Field of Classification Search
   CPC ............ G02B 2/207; G02B 2207/101; G02F 1/01791; C01G 9/08; C01G 15/006; C09K 11/70; C09K 11/883; B82Y 20/00
   See application file for complete search history.

(56) References Cited

U.S. PATENT DOCUMENTS 10,158,054 B1   12/2018   Lin et al.
10,170,648 B2   1/2019    Jun et al.
(Continued)

FOREIGN PATENT DOCUMENTS

CN    109642149 A    4/2019
EP    3228640 A1     10/2017
(Continued)

OTHER PUBLICATIONS

Hung Chia Wang, Heng Zhang, Hao Yue Chen, Han Cheng Yeh, Mei Rurng Tseng, Ren Jei Chung, Shuming Chen, and Ru Shi Liu Cadmium-Free InP/ZnSeS/ZnS Heterostructure-Based Quantum Dot Light-Emitting Diodes with a ZnMgO Electron Transport Layer and a Brightness of Over 10 000 cd m-2, small, 13, 1603962. (Year: 2017).*

(Continued)

*Primary Examiner* — Bijan Ahvazi
(74) *Attorney, Agent, or Firm* — CANTOR COLBURN LLP

(57) ABSTRACT

A color filter including a first layer including first quantum dots and a second layer including second quantum dots that are different from the first quantum dots, and disposed on the first layer, wherein a quantum yield of the first quantum dots is greater than a quantum yield of the second quantum dots, and wherein an absorption of blue light of the second quantum dots is greater than an absorption of the blue light of the first quantum dots.

17 Claims, 11 Drawing Sheets

Overlapping Pairing (1) $A_{1st}$ and $PL_{2nd}$
(2) $A_{2nd}$ and $PL_{2nd}$
(3) $A_{1st}$ and $PL_{1st}$
(4) $A_{2nd}$ and $PL_{1st}$ area comparison (4) < (3), (2) < (1)

(51) Int. Cl.
*C01G 15/00* (2006.01)
*C09K 11/70* (2006.01)
*C09K 11/88* (2006.01)
*G02F 1/017* (2006.01)
*B82Y 20/00* (2011.01)
*B82Y 30/00* (2011.01)
*B82Y 40/00* (2011.01)

(52) U.S. Cl.
CPC ........ *C09K 11/883* (2013.01); *G02F 1/01791* (2021.01); *B82Y 20/00* (2013.01); *B82Y 30/00* (2013.01); *B82Y 40/00* (2013.01); *C01P 2004/64* (2013.01); *C01P 2004/80* (2013.01); *C01P 2006/60* (2013.01); *G02B 5/206* (2013.01); *G02B 2207/101* (2013.01)

(56) References Cited

U.S. PATENT DOCUMENTS

| | | |
|---|---|---|
| 10,950,741 B2 | 3/2021 | Jun et al. |
| 2008/0230764 A1 | 9/2008 | Burt |
| 2010/0051898 A1 | 3/2010 | Kim et al. |
| 2011/0240960 A1 | 10/2011 | Kim et al. |
| 2013/0146838 A1 | 6/2013 | Ku et al. |
| 2013/0308334 A1 | 11/2013 | Davis et al. |
| 2014/0230992 A1 | 8/2014 | Kim et al. |
| 2017/0306227 A1 | 10/2017 | Ippen et al. |
| 2017/0327737 A1 | 11/2017 | Yamaki et al. |
| 2018/0119007 A1 | 5/2018 | Ippen et al. |
| 2018/0327665 A1 | 11/2018 | Lee et al. |
| 2020/0024512 A1 | 1/2020 | Min et al. |
| 2020/0172806 A1 | 6/2020 | Park et al. |
| 2020/0407627 A1* | 12/2020 | Zhou .................. C09K 11/883 |
| 2021/0167228 A1 | 6/2021 | Jun et al. |

FOREIGN PATENT DOCUMENTS

| | | |
|---|---|---|
| JP | 2015529698 A | 10/2015 |
| JP | 2019021890 A | 2/2019 |
| KR | 20100027892 A | 3/2010 |
| KR | 20130065320 A | 6/2013 |
| KR | 101537296 B1 | 7/2015 |
| KR | 20150134926 A | 12/2015 |
| KR | 101687086 B1 | 12/2016 |
| KR | 20170059597 A | 5/2017 |
| KR | 101774775 B1 | 9/2017 |
| KR | 20180108012 A | 10/2018 |
| KR | 20180124765 A | 11/2018 |
| KR | 20190059208 A | 5/2019 |
| KR | 20200003209 A | 1/2020 |
| KR | 20200011029 A | 1/2020 |
| WO | 2006054402 A1 | 5/2006 |

OTHER PUBLICATIONS

Yongwook Kim, Sujin Ham, Hyosook Jang, Ji Hyun Min, Heejae Chung, +Junho Lee, Dongho Kim and Eunjoo Jang, Bright and Uniform Green Light Emitting InP/ZnSe/ZnS Quantum Dots for Wide Color Gamut Displays, ACS Appl. Nano Mater. 2019, 2, 1496-1504. (Year: 2019).*

Jung-Ho Jo, Dae-Yeon Jo, Sun-Hyoung Lee, Young Rag Do, and Heesun Yang, InP-Based Quantum Dots Having an InP Core, Composition-Gradient ZnSeS Inner Shell, and ZnS Outer Shell with Sharp, Bright Emissivity, and Blue Absorptivity for Display Devices, ACS Applied Nano Materials 2020, 3, 2, 1972-1980 (Year: 2020).*

Hung Chia Wang et al., "Cadmium-Free InP/ZnSeS/ZnS Heterostructure-Based Quantum Dot Light-Emitting Diodes with a ZnMgO Electron Transport Layer and a Brightness of Over 10 000 cd m-2," advanced science news, 2017, pp. 1-7, vol. 13, Issue 1603962.

Sang Hyeon Lee et al., "The effects of discrete and gradient mid-shell structures on the photoluminescence of single InP quantum dots," Nanoscale, Nov. 5, 2019, pp. 23251-23258, vol. 11.

Extended European Search Report dated Apr. 29, 2022 of corresponding EP Patent Application No. 21213333.4.

* cited by examiner

Pattern Preparation by using a photoresist

Repeating three times of patterning process for each pixel

COLOR FILTERS AND DEVICES INCLUDING THE SAME

CROSS-REFERENCE TO RELATED APPLICATION

This application claims priority to Korean Patent Application No. 10-2020-0171345 filed in the Korean Intellectual Property Office on Dec. 9, 2020, and all the benefits accruing therefrom under 35 U.S.C. § 119, the content of which in its entirety is incorporated herein by reference.

BACKGROUND

1. Field

A color filter including a quantum dot, and a display device including the same are disclosed.

2. Description of the Related Art

A quantum dot (i.e., a nano-sized semiconductor nanocrystal) may have a bandgap energy varying with particle size and composition of the nanocrystal. The quantum dot may exhibit a luminescence property, which may be used in a variety of fields. It is desired to develop a quantum dot that can realize, e.g., exhibit, improved luminescent properties and does not include a toxic element (such as cadmium or lead).

SUMMARY

An embodiment provides a luminescent type color filter (e.g., a color conversion panel) that can realize, e.g., exhibit, improved optical properties.

An embodiment provides a display device including the color filter.

In an embodiment, a color filter includes a first (sub) pixel (e.g., a first color conversion region) that is configured to emit a first light, wherein the first pixel include a light emitting layer (or a color conversion layer), and the light emitting layer includes a first layer including a plurality of first quantum dots (for example, dispersed in a first matrix) and a second layer including a plurality of second quantum dots that are different from the first quantum dots, wherein the second layer is disposed on (i.e., directly on) the first layer.

The second quantum dots may be dispersed in a second matrix. The second matrix may be the same as or different from the first matrix.

The color filter may further include a second (sub) pixel (e.g., a second color conversion region, hereinafter, "second pixel"), wherein the second pixel is configured to emit a second light different from the first light and includes a (second) quantum dot composite. A partition wall (e.g., a black matrix) may be provided between the first pixel and the second pixel for example for an optical isolation for each pixel.

In the light emitting layer, the first quantum dots or the first layer may exhibit a quantum yield that is greater than the second quantum dot or the second layer. In the light emitting layer, an absorption ratio for, e.g., of, blue light of, e.g., by, the second quantum dot or the second layer may be greater than an absorption of the blue light of, e.g., by, the first quantum dot or the first layer.

The first quantum dot(s) may exhibit a quantum yield of greater than or equal to about 80%.

The absorption for, e.g., of, the blue light of, e.g., by, the second quantum dot(s) may be greater than or equal to about 82%.

In a photoluminescent spectrum, each of the first quantum dots or the first layer (hereinafter, simply referred to as "first quantum dot" at times) or the second quantum dots or the second layer (hereinafter, simply referred to as "second quantum dot" at times) may exhibit a luminescent peak (e.g., a maximum luminescent peak) in a range of a green wavelength region.

The first quantum dot may have a full width at half maximum of a photoluminescent peak that is less, e.g., narrower, than a full width at half maximum of a photoluminescent peak of the second quantum dot.

In a photoluminescent spectrum, the first quantum dot may have a tail area percentage that is less than a tail area percentage of the second quantum dot.

A full width at half maximum of a photoluminescent peak of the first quantum dot may be less than about 43 nanometers (nm).

In a photoluminescent spectrum, the first quantum dot may have a tail area of less than or equal to about 20%.

In a photoluminescent spectrum, a difference between a luminescent peak wavelength of the first quantum dot and a luminescent peak wavelength of the second quantum dot may be greater than or equal to about 10 nm, or greater than or equal to about 15 nm and less than or equal to about 30 nm, or less than or equal to about 25 nm.

In an ultraviolet-visible (UV-Vis) spectrum, a difference between a first absorption peak wavelength of the first quantum dot and a first absorption peak wavelength of the second quantum dot may be greater than or equal to about 10 nm, or greater than or equal to about 15 nm and less than or equal to about 30 nm, or less than or equal to about 25 nm.

A luminescent peak wavelength of the first quantum dot may be from about 500 nm to about 550 nm.

A first absorption peak wavelength of the first quantum dot may be from about 470 nm to about 530 nm.

A luminescent peak wavelength of the second quantum dot may be from about 480 nm to about 530 nm.

A first absorption peak wavelength of the second quantum dot may be from about 450 nm to about 500 nm.

A first absorption peak wavelength of the second quantum dot may be less than a first absorption peak wavelength of the first quantum dot.

A (photo) luminescent peak wavelength of the second quantum dot may be greater than the first absorption peak wavelength of the first quantum dot.

A (photo) luminescent peak wavelength of the second quantum dot may be less than a (photo) luminescent peak wavelength of the first quantum dot.

In an embodiment, an overlapping area of a UV-Vis absorption spectrum of the second quantum dot with a photoluminescent spectrum of the first quantum dot may be less than an overlapping area of a UV-Vis absorption spectrum of the second quantum dot with a photoluminescent spectrum of the second quantum dot.

An overlapping area of a UV-Vis absorption spectrum of the second quantum dot with a photoluminescent spectrum of the first quantum dot may be less than an overlapping area of a UV-Vis absorption spectrum of the first quantum dot with a photoluminescent spectrum of the first quantum dot.

In an embodiment, an overlapping area of a UV-Vis absorption spectrum of the second quantum dot with a photoluminescent spectrum of the second quantum dot may be less than an overlapping area of a UV-Vis absorption spectrum of the first quantum dot with a photoluminescent spectrum of the second quantum dot.

An overlapping area of a UV-Vis absorption spectrum of the first quantum dot with a photoluminescent spectrum of the first quantum dot may be less than an overlapping area of a UV-Vis absorption spectrum of the first quantum dot with a photoluminescent spectrum of the second quantum dot.

The first quantum dots and the second quantum dots may each independently have a core shell structure. The core shell structure may be a core-multi-layered shell. The core multi-layered shell may include a semiconductor nanocrystal core, a first semiconductor nanocrystal shell disposed on the semiconductor nanocrystal core, and a second semiconductor nanocrystal shell disposed on the first semiconductor nanocrystal shell.

A thickness of the first semiconductor nanocrystal shell of the first quantum dot may be different from a thickness of the first semiconductor nanocrystal shell of the second quantum dot.

A thickness of the second semiconductor nanocrystal shell of the first quantum dot may be different from a thickness of the second semiconductor nanocrystal shell of the second quantum dot.

A thickness of the first semiconductor nanocrystal shell of the first quantum dot may be different from a thickness of the first semiconductor nanocrystal shell of the second quantum dot, and a thickness of the second semiconductor nanocrystal shell of the first quantum dot may be different from a thickness of the second semiconductor nanocrystal shell of the second quantum dot.

A particle size (or an average particle size) of first quantum dot(s) may be greater than a particle size (or an average particle size) of second quantum dot(s) by about at least 1.0 nm.

The first quantum dot(s) have a (average) particle size of from about 5.0 nm to about 10.0 nm.

The second quantum dot(s) have a (average) particle size of from about 2.0 nm to about 8.0 nm.

In the first quantum dot(s), a (average) thickness of the first semiconductor nanocrystal shell may be from about 0.5 times to about 1.5 times a size of the semiconductor nanocrystal core.

In the first quantum dot(s), a (average) thickness of the second semiconductor nanocrystal shell may be from about 0.05 times to about 0.3 times a size of the semiconductor nanocrystal core.

In the second quantum dot(s), a (average) thickness of the first semiconductor nanocrystal shell may be from about 0.1 times to about 0.6 times a size of the semiconductor nanocrystal core.

In the second quantum dot(s), a (average) thickness of the second semiconductor nanocrystal shell may be from about 0.1 times to about 0.6 times a size of the semiconductor nanocrystal core.

In the first quantum dot(s), the semiconductor nanocrystal core may include indium (In) and phosphorus (P), and optionally zinc (Zn), and the first semiconductor nanocrystal shell layer of the first quantum dot(s) disposed on the semiconductor nanocrystal core of the first quantum dot(s) may include zinc and selenium, and the second semiconductor nanocrystal shell layer of the first quantum dot(s) disposed on the first semiconductor nanocrystal shell of the first quantum dot(s) may include zinc and sulfur.

In the second quantum dot(s), the semiconductor nanocrystal core may include indium (In) and phosphorus (P), and optionally zinc (Zn), and the first semiconductor nanocrystal shell layer of the second quantum dot(s) disposed on the semiconductor nanocrystal core of the second quantum dot(s) may include zinc, selenium, and sulfur, and the second semiconductor nanocrystal shell layer of the second quantum dot(s) disposed on the first semiconductor nanocrystal shell of the second quantum dot(s) may include zinc and sulfur.

The first layer may include a polymer matrix and the plurality of the first quantum dots dispersed in the polymer matrix.

The second layer may include a polymer matrix and the plurality of the second quantum dots dispersed in the polymer matrix.

A thickness ratio between the first layer and the second layer may be from about 7.5:about 2.5 to about 2.5:about 7.5.

A thickness ratio between the first layer and the second layer may be from about 1:about 0.1 to about 1:about 10, for example, (e.g., 1:0.5 to about 1:2, 1:0.75 to about 1:1.25, or about 1:1).

The first layer may further include the second quantum dots. In the first layer, an amount of the first quantum dots may be greater than an amount of the second quantum dots. The second layer may further include the first quantum dots. In the second layer, an amount of the second quantum dots may be greater than an amount of the first quantum dots.

In the light emitting layer, in a direction from the first layer toward the second layer or in a light extraction direction, an amount of the first quantum dots may (for example, gradually) decrease and an amount of the second quantum dots may (for example, gradually) increase.

In an embodiment, the light emitting layer may have a photoconversion of greater than or equal to about 32%, greater than or equal to about 33%, or greater than or equal to about 34%, a blue light absorption of greater than or equal to about 88%, and a tail emission area percentage over about 580 nm may be less than or equal to about 20%, or less than or equal to about 15% of a total area of a photoluminescent spectrum.

In an embodiment, the light emitting layer may have a photoconversion efficiency of greater than or equal to about 30%, greater than or equal to about 31%, greater than or equal to about 32%, greater than or equal to about 33%, greater than or equal to about 35%, greater than or equal to about 36%, greater than or equal to about 37%, greater than or equal to about 38%, greater than or equal to about 39%, or greater than or equal to about 40%.

In an embodiment, the light emitting layer may have a photoconversion at 80° C. of greater than or equal to about 30%, or greater than or equal to about 31%.

In an embodiment, a display device includes the aforementioned color filter.

The display device may further include a light source that is configured to provide the color filter with incident light.

The incident light may have a peak wavelength of about 440 nm to about 465 nm, or about 450 nm to about 460 nm.

In the display device, the color filter may be disposed such that the first layer faces or is proximate (e.g., closer) the light source. In the display device, the first layer may be disposed between the second layer and the light source.

An embodiment is related to an electronic apparatus including the aforementioned color filter or the aforementioned display device.

The electronic apparatus may include or may be a television (TV) set, a monitor, a mobile device, a virtual reality (VR)/augmented reality (AR) device, a display device for an electronic vehicle, or a combination thereof.

In an embodiment, the color filter may show, e.g., exhibit, improved blue light absorption and reduce reabsorption of front luminescence and increase recycling of backward luminescence. The color filter may achieve improved level of light emitting efficiency and a higher, e.g., greater, photoconversion. The color filter may also show, e.g., exhibit, a narrow full width at half maximum of a photoluminescent spectrum and a decreased tail area, contributing a color purity of the device.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
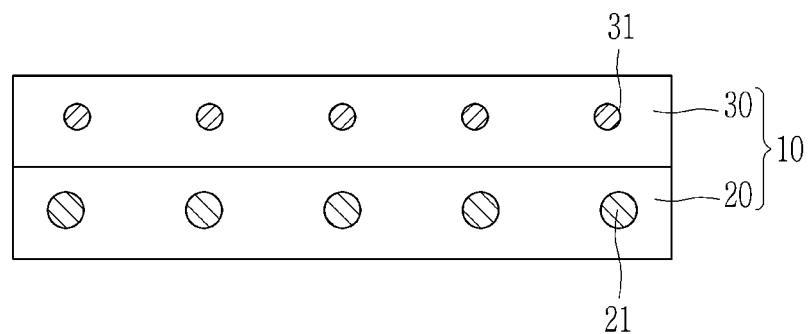
FIG. 1 shows a schematic view of a color filter according to an embodiment.

Advantages and characteristics of this disclosure, and a method for achieving the same, will become evident referring to the following example embodiments together with the drawings attached hereto. However, the embodiments should not be construed as being limited to the embodiments set forth herein. Rather, these embodiments are provided so that this disclosure will be thorough and complete, and will fully convey the scope of the invention to those skilled in the art.

Unless otherwise defined, all terms (including technical and scientific terms) in the specification may be defined as commonly understood by one skilled in the art to which this disclosure belongs. It will be further understood that terms, such as those defined in a generally-used dictionary should be interpreted as having a meaning that is consistent with their meaning in the context of the relevant art and the present disclosure, and will not be interpreted ideally or exaggeratedly unless expressly so defined.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the singular forms "a," "an," and "the" are intended to include the plural forms, including "at least one," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer" or "section" discussed below could be termed a second element, component, region, layer, or section without departing from the teachings herein.

Furthermore, relative terms, such as "lower" and "upper," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within ±10% or ±5% of the stated value.

As used herein, the term "Group" may refer to a group of Periodic Table.

As used herein, "Group III" refers to Group IIIA and Group IIIB, and examples of Group III metal may be Al, In, Ga, and TI, but are not limited thereto.

As used herein, "Group IV" refers to Group IVA and Group IVB, and examples of a Group IV metal may be Si, Ge, and Sn, but are not limited thereto. As used herein, the term "metal" includes a semi-metal such as Si.

As used herein, "Group V" may refer to Group VA, and examples thereof may include nitrogen, phosphorus, arsenic, antimony, and bismuth, but are not limited thereto.

As used herein, a dimension (e.g., a size, a diameter, or a thickness, or the like) may be for a single quantum dot or a (e.g., a mean or a median) average value for quantum dots or a population of the quantum dots. The term "average" (e.g., an average size of the quantum dot) may be mean or median. The dimension may be a value obtained from an electron microscopy analysis. The dimension may be a value calculated from the composition, the optical properties, or a combination thereof (e.g., an UV-Vis absorption wavelength) of the quantum dots.

Unless recited to the contrary, a "ratio" between chemical elements may refer to a mole ratio.

A quantum efficiency (or quantum yield) of the quantum dot may be readily and reproducibly measured in a solution state or a solid state (in a composite). In an embodiment, "quantum yield (or quantum efficiency)" may be a ratio, e.g., a relative amount, of photons emitted to photons absorbed, e.g., by a nanostructure or population of nanostructures. In an embodiment, the quantum efficiency may be determined by any suitable method. For example, there may be two methods for measuring the fluorescence quantum yield or efficiency: the absolute method and the relative method. The absolute method directly obtains the quantum yield by detecting all sample fluorescence through the use of an integrating sphere. In the relative method, the fluorescence intensity of a standard sample (e.g., a standard dye) may be compared with the fluorescence intensity of an unknown sample to calculate the quantum yield of the unknown sample. Coumarin 153, Coumarin 545, Rhodamine 101 inner salt, Anthracene, and Rhodamine 6G may be used as standard dye, depending on the PL wavelengths, but are not limited thereto.

The quantum yield (QY) may be readily and reproducibly determined by using commercially available equipment, for example, from Hitachi Co. Ltd. or Hamamatsu Co. Ltd. and referring to the instruction manuals provided from the manufacturer.

As used herein, the term light conversion efficiency refers to a light emission dose relative to an absorbed light dose of a quantum dot polymer composite from excitation light (i.e., blue light). As used herein, the term light conversion refers to a light emission dose relative to a light dose of the excitation or incident light.

In order to obtain light conversion efficiency and light conversion, a total light dose, (B), of excitation light (i.e., an incident light) is measured, and then the PL spectrum of the quantum dot polymer composite film with, e.g., using, the excitation light is obtained, from the PL spectrum, a dose (A) of light in a green or red wavelength emitted from the quantum dot composite film and a dose (B') of excitation light passing the quantum dot composite are obtained to calculate a light conversion, a blue light absorption, and a light conversion efficiency based on the following equations:

$$A/B \times 100\% = \text{light conversion (\%)}$$

$$A/(B-B') \times 100\% = \text{light conversion efficiency (\%)}$$

$$(B-B')/B \times 100\% = \text{blue light absorption (\%)}$$

As used herein, "first absorption peak wavelength" refers to a wavelength of the first main peak appearing in the lowest energy region in an ultraviolet-visible absorption spectrum.

The full width at half maximum (FWHM or fwhm) and the maximum luminescent peak wavelength may be determined by a (photo) luminescent spectrum obtained by a spectrophotometer (or Fluorescence Spectrophotometer).

As used herein, the expression "not including cadmium (or other harmful heavy metal)" may refer to the case in which a concentration of each of cadmium (or another heavy metal deemed harmful) may be less than or equal to about 100 parts per million by weight (ppmw), less than or equal to about 50 ppmw, less than or equal to about 10 ppmw, less than or equal to about 1 ppmw, less than or equal to about 0.1 ppmw, less than or equal to about 0.01 ppmw, or about zero ppmw. In an embodiment, substantially no cadmium (or other heavy metal) may be present or, if present, an amount of cadmium (or other heavy metal) may be less than or equal to a detection limit or as an impurity level of a given analysis tool (e.g., an inductively coupled plasma atomic emission spectroscopy).

As used herein, when a definition is not otherwise provided, "substituted" refers to replacement of hydrogen of a compound by a substituent such as a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C30 cycloalkenyl group, a C3 to C30 cycloalkynyl group, a C2 to C30 heterocycloalkyl group, a halogen (—F, —Cl, —Br, or —I), a hydroxy group (—OH), a nitro group (—NO$_2$), a cyano group (—ON), an amino or amine group (—NRR' wherein R and R' are independently hydrogen or a C1 to C6 alkyl group), an azido group (—N$_3$), an amidino group (—O(=NH)NH$_2$), a hydrazino group (—NHNH$_2$), a hydrazono group (=N(NH$_2$)), an aldehyde group (—O(=O)H), a carbamoyl group (—C(O)NH$_2$), a thiol group (—SH), an ester group (—O(=O)OR, wherein R is a 01 to C6 alkyl group or a C6 to C12 aryl group), a carboxyl group (—COOH) or a salt thereof (—O(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), or a combination thereof.

As used herein, when a definition is not otherwise provided, the prefix "hetero" refers to inclusion of a, e.g., at least one (for example, one to three), heteroatom of N, O, S, Si, or P.

As used herein, when a definition is not otherwise provided, "aliphatic" refers to a C1 to C30 linear or branched alkyl group, a C2 to C30 linear or branched alkenyl group, or a C2 to C30 linear or branched alkynyl group, and "aromatic" refers to a C6 to C30 aryl group or a C2 to C30 heteroaryl group.

As used herein, when a definition is not otherwise provided, "(meth)acrylate" refers to acrylate, methacrylate, or a combination thereof.

A quantum dot is a crystalline semiconductor material (e.g., semiconductor nanocrystal particle) having a nanoscale size. The quantum dot has a large surface area per a unit volume due to the very small particle size, and thus, exhibits a quantum confinement effect and different properties than those of a bulk material having the same elemental composition. The quantum dot may absorb light, e.g., energy, from an excitation source and then emit light energy corresponding to a bandgap energy of the quantum dot.

The quantum dot has unique photoluminescence characteristics, having a potential of being used in a variety of electronic devices (e.g., display device). Quantum dots exhibiting optical properties applicable to, e.g., usable in, electronic devices such as for displays may be based on a cadmium compound. However, cadmium is one of the elements that can raise serious environment/health problems and concerns, and thus belongs to a restricted element under Restriction of Hazardous Substances Directive (RoHS) in many countries.

Accordingly, development of a cadmium-free quantum dot having improved photoluminescence characteristics may be desired and of interest. Cadmium-free quantum dots may be based on, e.g., include, a Group III-V compound. The cadmium free quantum dots or a color filter including the cadmium-free quantum dots may exhibit poor or insufficient absorption of blue light. A color filter based on, e.g., including, cadmium-free quantum dots may show, e.g., exhibit, a relatively low level of photoconversion or a relatively wide full width at half maximum of the luminescent spectrum.

In an embodiment, a color filter includes a first layer including first quantum dot(s) and a second layer including second quantum dots. In an embodiment, the color filter may include a first pixel (or a first color conversion region) that includes a light emitting layer, and the light emitting layer may include the first layer and the second layer.

In the color filter of an embodiment, a photoluminescent spectrum of quantum dots included in one of the two layers and an UV-Vis absorption spectrum of quantum dots included in the other of the two layers may be overlapped, e.g., may overlap one another, in such a way that the blue light passing through or absorbed by the quantum dots included in the one of the two layers may be used or re-absorbed by the quantum dots included in the other of the two layers and the light moving backward (e.g., backward emission) from the quantum dots in the other of the two layers may obtain, e.g., provide, an additional chance to be recycled, and thus the color filter may show, e.g., exhibit, increased luminescent properties, absorption properties, or a combination thereof as a whole.

Figure 2:
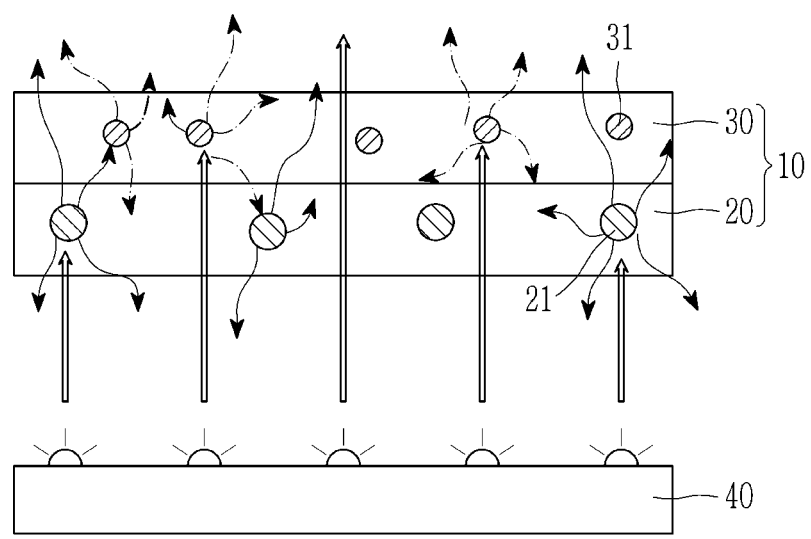
FIG. 2 is a view illustrating improvement of a light emitting efficiency by a two layered structure in the color filter of FIG. 1.

FIG. 1 shows a cross-section view schematically illustrating a color filter according to an embodiment. FIG. 2 shows a view illustrating improvement of photo conversion properties of the color filter having the first and the second layers.

Referring to FIG. 1, the color filter 10 may have a layered structure including a first layer 20 and a second layer 30 disposed on the first layer 20. The first layer 20 includes first quantum dots 21, which are dispersed in the first layer. The second layer 30 includes second quantum dots 31, which are dispersed in the second layer 30.

Referring to FIG. 2, the first quantum dots 21 may receive incident light from a light source 40 and may be excited and then return to a ground state, emitting light for example, in a radial direction. The first quantum dot 21 may show, e.g., exhibit, an isotropic luminescent property and thus a light loss may occur due to the light emitting toward the light source 40.

The second quantum dots 31 may receive incident light from a light source 40 and may be excited and then return to a ground state, emitting light for example, in a radial direction. In an embodiment, the second quantum dots 31 may absorb light from the light source and may also absorb the light emitted from the first quantum dots 21.

The second quantum dots 31 may show, e.g., exhibit, an isotropic luminescent property and the light may be emitted from the second quantum dots 31 in a direction toward the first layer 21, and may be re-absorbed by the first quantum dots 21, and then may be emitted again by the first quantum dots.

In an embodiment, the blue light passing through or absorbed by the first quantum dots may be re-used or re-absorbed by the second quantum dots and thus the color filter may exhibit improved emission together with improved absorption. In an embodiment, the blue light absorbed by the second quantum dots and the blue light not absorbed by the second quantum dots may be reused or reabsorbed by the first quantum dots and thus the color filter may exhibit improved emission together with improved absorption. In an embodiment, radial light may be recycled from one layer to another layer in the color filter 10.

In FIG. 2, a proceeding path of the incident light, a proceeding path of the radial light from the first quantum dots 21, a proceeding path of the radial light from the second quantum dots 31 are denoted with a double arrow, a thick arrow, and an alternated long and short dash line, respectively. In FIG. 2, the first layer 20 may face the light source 40. In an embodiment, the second layer 30 may face the light source 40.

In the color filter of an embodiment, a photoluminescent spectrum of quantum dots included in one of the two layers and an UV-Vis absorption spectrum of quantum dots included in the other of the two layers may be overlapped, e.g., may overlap one another. In an embodiment, the first quantum dots may have a first absorption peak wavelength and a photoluminescent peak wavelength each being relatively long (e.g., longer or greater than those of the second quantum dots) and may show, e.g., exhibit, a relatively low light absorption, a relatively narrow full width at half maximum of a photoluminescent peak, and a relatively small photoluminescent tail area. In an embodiment, the second quantum dots may have a first absorption peak wavelength and a photoluminescent peak wavelength each being relatively short (e.g., shorter than the first quantum dots) and may show, e.g., exhibit, a relatively high light absorption, a relatively narrow wide width at half maximum of a photoluminescent peak, a relatively low luminescent efficiency, and a relatively large photoluminescent tail area percentage.

In an embodiment, the first quantum dots having a relatively long luminescent peak wavelength may exhibit a reduced reabsorption of a front or forward emission and the second quantum dots having a relatively shorter luminescent wavelength may increase a recycling of a backward emission, whereby a luminescent contribution of the first quantum dots may increase and the color filter may exhibit a relatively high luminescent efficiency and a narrower fwhm together with a reduced tail emission, realizing, e.g., exhibiting, a high color purity.

In an embodiment, the first quantum dot(s) (or a first quantum dot population, hereinafter, first quantum dot) and the second quantum dot(s) (or a second quantum dot population, hereinafter, second quantum dot) may have core shell structure having a core and a shell disposed on the core. The core(s) of the first quantum dot may have a size (or an average size), a composition (e.g., an indium phosphide including zinc), or a combination thereof that is substantially the same as the core(s), the composition, or a combination thereof of the second quantum dot. A thickness (or an average thickness) of the shell of the first quantum dot may be different from (e.g., greater than) a thickness (or an average thickness) of the shell of the second quantum dot.

The core may have a size (or an average size) of greater than or equal to about 1 nm (e.g., greater than or equal to about 2 nm) and less than or equal to about 2.7 nm, less than about 2.7 nm, or less than or equal to about 2.5 nm.

The first quantum dots and the second quantum dots may emit light having the same color, for example, when provided, e.g., irradiated, with incident light of about 450 nm in a composite state. In an embodiment, a difference between a photoluminescent peak wavelength of the first quantum dot population and a photoluminescent peak wavelength of the second quantum dot population may be less than or equal to about 30 nm, less than or equal to about 20 nm, less than or equal to about 18 nm, less than or equal to about 15 nm, less than or equal to about 10 nm, less than or equal to about 9 nm, less than or equal to about 8 nm, less than or equal to about 7 nm, less than or equal to about 6 nm, less than or equal to about 5 nm, or less than or equal to about 4 nm.

In an embodiment, each of the first quantum dots and the second quantum dots may emit light of substantially the same color with, e.g., as, each other and in an embodiment, a full width at half maximum of a luminescent peak of the quantum dot composite including the first quantum dots and the second quantum dots may be less than or equal to about 45 nm, less than or equal to about 44 nm, less than or equal to about 43 nm, less than or equal to about 42 nm, less than or equal to about 41 nm, less than or equal to about 40 nm, less than or equal to about 39 nm, less than or equal to about 38 nm, or less than or equal to about 37 nm. In an embodiment, the fwhm of the quantum dot composite or the light emitting layer may be greater than or equal to about 5 nm, greater than or equal to about 10 nm, greater than or equal to about 15 nm, greater than or equal to about 20 nm, or greater than or equal to about 25 nm.

In an embodiment, the first quantum dots (or a population thereof) may include (e.g., exhibit in a size analysis) a first particle size (e.g., a first average particle size). In an embodiment, the second quantum dots (or a population thereof) may include (e.g., exhibit in a size analysis) a second particle size (e.g., a second average particle size). In an embodiment, the size of the quantum dot may refer to a diameter or an equivalent diameter obtained from a two-dimensional image of an electron microscopy analysis (e.g., under an assumption of a circle). A size of the quantum dot(s) may be determined by using a result (e.g., an image) of a (transmission) electron microscopy analysis and any suitable image analysis computer program (e.g., Image J). The first particle size may be greater than the second particle size.

In an embodiment, a difference between the first particle size and the second particle size may be greater than or equal to about 0.5 nm, greater than or equal to about 0.6 nm, greater than or equal to about 0.7 nm, greater than or equal to about 0.8 nm, greater than or equal to about 0.9 nm, greater than or equal to about 1 nm, greater than or equal to about 1.1 nm, greater than or equal to about 1.2 nm, greater than or equal to about 1.3 nm, greater than or equal to about 1.4 nm, greater than or equal to about 1.5 nm, greater than or equal to about 1.6 nm, greater than or equal to about 1.7 nm, greater than or equal to about 1.8 nm, greater than or equal to about 1.9 nm, greater than or equal to about 2 nm, greater than or equal to about 2.3 nm, greater than or equal to about 2.5 nm, greater than or equal to about 2.7 nm, greater than or equal to about 3 nm, or greater than or equal to about 3.5 nm.

In an embodiment, a difference between the first particle size and the second particle size may be less than or equal to about 5 nm, less than or equal to about 4.8 nm, less than or equal to about 4.5 nm, less than or equal to about 4.3 nm, less than or equal to about 4.2 nm, less than or equal to about 4.1 nm, less than or equal to about 4 nm, less than or equal to about 3.9 nm, less than or equal to about 3.8 nm, less than or equal to about 3.7 nm, less than or equal to about 3.6 nm, less than or equal to about 3.5 nm, less than or equal to about 3.4 nm, less than or equal to about 3.3 nm, less than or equal to about 3.2 nm, less than or equal to about 3.1 nm, less than or equal to about 3 nm, less than or equal to about 2.9 nm, less than or equal to about 2.8 nm, less than or equal to about 2.7 nm, less than or equal to about 2.6 nm, less than or equal to about 2.5 nm, less than or equal to about 2.4 nm, less than or equal to about 2.3 nm, less than or equal to about 2.2 nm, less than or equal to about 2.1 nm, less than or equal to about 2 nm, less than or equal to about 1.9 nm, less than or equal to about 1.8 nm, less than or equal to about 1.7 nm, less than or equal to about 1.6 nm, less than or equal to about 1.5 nm, less than or equal to about 1.4 nm, less than or equal to about 1.3 nm, less than or equal to about 1.2 nm, less than or equal to about 1.1 nm, or less than or equal to about 1 nm.

In an embodiment, the second particle size may be greater than or equal to about 3.5 nm, greater than or equal to about 3.6 nm, greater than or equal to about 3.7 nm, greater than or equal to about 3.8 nm, greater than or equal to about 3.9 nm, greater than or equal to about 4.0 nm, greater than or equal to about 4.1 nm, greater than or equal to about 4.2 nm, greater than or equal to about 4.3 nm, greater than or equal to about 4.4 nm, or greater than or equal to about 4.5 nm.

In an embodiment, the first particle size may be less than or equal to about 7 nm, less than or equal to about 6.9 nm, less than or equal to about 6.8 nm, less than or equal to about 6.7 nm, less than or equal to about 6.6 nm, less than or equal to about 6.5 nm, less than or equal to about 6.4 nm, less than or equal to about 6.3 nm, less than or equal to about 6.2 nm, less than or equal to about 6.1 nm, less than or equal to about 6 nm, less than or equal to about 5.9 nm, less than or equal to about 5.8 nm, less than or equal to about 5.7 nm, less than or equal to about 5.6 nm, less than or equal to about 5.5 nm, less than or equal to about 5.4 nm, less than or equal to about 5.3 nm, less than or equal to about 5.2 nm, less than or equal to about 5.1 nm, less than or equal to about 5 nm, less than or equal to about 4.9 nm, less than or equal to about 4.8 nm, less than or equal to about 4.7 nm, less than or equal to about 4.6 nm, less than or equal to about 4.5 nm, less than or equal to about 4.4 nm, less than or equal to about 4.3 nm, less than or equal to about 4.2 nm, less than or equal to about 4.1 nm, or less than or equal to about 4 nm.

In an embodiment, the first particle size may be greater than or equal to about 5 nm, greater than or equal to about 5.1 nm, greater than or equal to about 5.2 nm, greater than or equal to about 5.3 nm, greater than or equal to about 5.4 nm, greater than or equal to about 5.5 nm, greater than or equal to about 5.6 nm, greater than or equal to about 5.7 nm, greater than or equal to about 5.8 nm, greater than or equal to about 5.9 nm, greater than or equal to about 6 nm, greater than or equal to about 6.1 nm, greater than or equal to about 6.2 nm, greater than or equal to about 6.3 nm, greater than or equal to about 6.4 nm, greater than or equal to about 6.5 nm, greater than or equal to about 6.6 nm, greater than or equal to about 6.7 nm, greater than or equal to about 6.8 nm, greater than or equal to about 6.9 nm, or greater than or equal to about 7 nm.

In an embodiment, the second particle size may be less than or equal to about 10 nm, less than or equal to about 9.5 nm, less than or equal to about 9 nm, less than or equal to about 8.5 nm, less than or equal to about 8 nm, less than or equal to about 7.9 nm, less than or equal to about 7.8 nm, less than or equal to about 7.7 nm, less than or equal to about 7.6 nm, less than or equal to about 7.5 nm, less than or equal to about 7.4 nm, less than or equal to about 7.3 nm, less than or equal to about 7.2 nm, less than or equal to about 7.1 nm, less than or equal to about 7 nm, less than or equal to about 6.9 nm, less than or equal to about 6.8 nm, less than or equal to about 6.7 nm, less than or equal to about 6.6 nm, less than or equal to about 6.5 nm, less than or equal to about 6.4 nm, less than or equal to about 6.3 nm, less than or equal to about 6.2 nm, less than or equal to about 6.1 nm, less than or equal to about 6 nm, less than or equal to about 5.9 nm, less than or equal to about 5.8 nm, less than or equal to about 5.7 nm, less than or equal to about 5.6 nm, or less than or equal to about 5.5 nm.

In an embodiment, the first quantum dots may have an increased thickness of a shell on a core including indium and phosphorus such as indium phosphide in a controlled manner (e.g., a first shell layer of greater than or equal to about 1 nm or greater than or equal to about 3 monolayers and a second shell layer having a thickness of less than about 0.7 nm).

In the quantum dots of the first quantum dots, the first shell layer may include a semiconductor nanocrystal including zinc and selenium. The first shell layer may or may not include sulfur.

A thickness of the first shell layer may be greater than or equal to about 1.2 nm, greater than or equal to about 1.5 nm, or greater than or equal to about 2 nm. A thickness of the first shell layer may be less than or equal to about 3 nm, less than or equal to about 2.9 nm, less than or equal to about 2.8 nm, less than or equal to about 2.7 nm, less than or equal to about 2.6 nm, less than or equal to about 2.5 nm, less than or equal to about 2.4 nm, less than or equal to about 2.3 nm, less than or equal to about 2.2 nm, less than or equal to about 2.1 nm, less than or equal to about 2 nm, less than or equal to about 1.9 nm, less than or equal to about 1.8 nm, less than or equal to about 1.7 nm, less than or equal to about 1.6 nm, less than or equal to about 1.5 nm, or less than or equal to about 1.4 nm.

The second shell layer may be disposed on (e.g., directly on) the first shell layer. In the quantum dots of the first quantum dot population, the second layer may include a semiconductor nanocrystal including zinc and sulfur. A thickness of the second shell layer may be less than or equal to about 0.7 nm, less than or equal to about 0.65 nm, less than or equal to about 0.64 nm, less than or equal to about 0.63 nm, less than or equal to about 0.62 nm, less than or equal to about 0.61 nm, less than or equal to about 0.6 nm, less than or equal to about 0.55 nm, less than or equal to about 0.5 nm, less than or equal to about 0.45 nm, or less than or equal to about 0.4 nm. In an embodiment, a thickness of the second layer may be greater than or equal to about 0.15 nm, greater than or equal to about 0.16 nm, greater than or equal to about 0.17 nm, greater than or equal to about 0.18 nm, greater than or equal to about 0.19 nm, greater than or equal to about 0.2 nm, greater than or equal to about 0.21 nm, greater than or equal to about 0.22 nm, greater than or equal to about 0.23 nm, greater than or equal to about 0.24 nm, greater than or equal to about 0.25 nm, greater than or equal to about 0.26 nm, or greater than or equal to about 0.27 nm.

The first quantum dots may include a mole ratio of zinc to indium of less than or equal to about 48:1, less than or equal to about 47:1, less than or equal to about 46:1, less than or equal to about 45:1, less than or equal to about 44:1, less than or equal to about 43:1, less than or equal to about 42:1, less than or equal to about 41:1, less than or equal to about 40:1, less than or equal to about 35:1, less than or equal to about 25:1, less than or equal to about 23:1, less than or equal to about 22:1, less than or equal to about 20:1, less than or equal to about 15:1, or less than or equal to about 10:1. In an embodiment, the second quantum dots may include a mole ratio of zinc to indium of greater than or equal to about 3:1, greater than or equal to about 4:1, greater than or equal to about 5:1, greater than or equal to about 6:1, greater than or equal to about 7:1, greater than or equal to about 8:1, greater than or equal to about 9:1, greater than or equal to about 10:1, greater than or equal to about 20:1, greater than or equal to about 30:1, greater than or equal to about 35:1, greater than or equal to about 40:1, or greater than or equal to about 43:1.

The first quantum dots may include a mole ratio of sulfur with respect to selenium of less than or equal to about 2.4:1, less than or equal to about 2.3:1, less than or equal to about 2.2:1, less than or equal to about 2.1:1, less than or equal to about 2.0:1, less than or equal to about 1.9:1, less than or equal to about 1.8:1, less than or equal to about 1.7:1, less than or equal to about 1.6:1, less than or equal to about 1.5:1, less than or equal to about 1.4:1, less than or equal to about 1.3:1, less than or equal to about 1.2:1, less than or equal to about 1.1:1, less than or equal to about 1:1, less than or equal to about 0.9:1, less than or equal to about 0.8:1, less than or equal to about 0.7:1, or less than or equal to about 0.6:1. In the first quantum dots of an embodiment, a mole ratio of sulfur to selenium may be greater than or equal to about 0.05:1, greater than or equal to about 0.07:1, greater than or equal to about 0.1:1, greater than or equal to about 0.2:1, greater than or equal to about 0.3:1, greater than or equal to about 0.4:1, or greater than or equal to about 0.5:1.

The second quantum dots may have a similar or substantially the same core composition and a different shell composition (e.g., a reduced thickness of the first shell layer) and thus may have a reduced size. The second quantum dots may have different optical properties (e.g., a UV-Vis absorption spectrum different from the first quantum dots).

In a UV-Vis absorption spectroscopy analysis, the first quantum dots may exhibit a first absorption peak in a wavelength range of from about 475 nm to about 525 nm, from about 480 nm to about 520 nm, from about 485 nm to about 515 nm, from about 490 nm to about 510 nm, from about 500 nm to about 505 nm, or a combination thereof. In a UV-Vis absorption spectroscopy analysis, the first quantum dots may exhibit a first absorption peak that is present in a longer, e.g., greater, wavelength region than that of the second quantum dots, as recited herein.

In a UV-Vis absorption spectrum curve, the first quantum dots may exhibit a valley at, e.g., in, a wavelength range of less than or equal to about 450 nm and show, e.g., exhibit, a negative differential coefficient value at 450 nm.

In an embodiment, the second quantum dots have a core shell structure and a thickness of the shell may be about 6 monolayers (ML) or less, about 5.5 ML or less, about 5 ML or less, or about 4.5 ML or less. The thickness of the shell of the second quantum dots may be about 2 ML or more, about 2.5 ML or more, about 3 ML or more, or about 3.5 ML or more. The thickness of the shell of the second quantum dots may be less than or equal to about 2.3 nm, for example, less than or equal to about 2.2 nm, less than or equal to about 2.1 nm, less than or equal to about 2 nm, less than or equal to about 1.9 nm, less than or equal to about 1.8 nm, less than or equal to about 1.7 nm, less than or equal to about 1.6 nm, less than or equal to about 1.5 nm, or less than or equal to about 1.4 nm. The thickness of the shell of the second quantum dots may be greater than or equal to about 0.5 nm, greater than or equal to about 0.6 nm, greater than or equal to about 0.7 nm, greater than or equal to about 0.8 nm, greater than or equal to about 0.9 nm, or greater than or equal to about 1 nm.

The second quantum dots may have a shell disposed on the core. In an embodiment, the shell may have a multi-layered structure. In the multi-layered shell, a first shell layer (e.g., ZnSeS layer) may be disposed (e.g., directly) on the semiconductor nanocrystal core and may include zinc, selenium, and sulfur, and the second shell layer (e.g., ZnS) may be disposed (e.g., directly) on the first shell layer and may include zinc and sulfur. A composition of the second shell layer may be different from that of the first shell. The second semiconductor nanocrystal shell may be an outermost layer of the quantum dots.

A thickness of the first shell layer may be about 4 monolayers (ML) or less, about 3.5 ML or less, or about 3 ML or less. The thickness of the first shell layer may be about 1 ML or more, about 1.5 ML or more, about 2 ML or more, or about 2.5 ML or more. A thickness of the second shell layer may be less than or equal to about 1 nm, less than or equal to about 0.9 nm, less than or equal to about 0.8 nm, less than or equal to about 0.7 nm, or less than or equal to about 0.6 nm. The thickness of the second shell layer may be about 1 ML or more, or about 1.5 ML or more.

In the light emitting layer (or in the first quantum dots, in the second quantum dots, or in a combination thereof) according to an embodiment, a mole ratio of sulfur to selenium may be less than or equal to about 3.5:1, less than or equal to about 3.4:1, less than or equal to about 3.3:1, less than or equal to about 3.2:1, less than or equal to about 3.1:1, less than or equal to about 3:1, less than or equal to about 2.9:1, less than or equal to about 2.8:1, less than or equal to about 2.7:1, less than or equal to about 2.6:1, less than or equal to about 2.5:1, less than or equal to about 2.4:1, less than or equal to about 2.3:1, less than or equal to about 2.2:1, less than or equal to about 2.1:1, less than or equal to about 2.0:1, less than or equal to about 1.9:1, less than or equal to about 1.8:1, less than or equal to about 1.7:1, less than or equal to about 1.6:1, less than or equal to about 1.5:1, less than or equal to about 1.4:1, less than or equal to about 1.3:1, less than or equal to about 1.2:1, less than or equal to about 1.1:1, or less than or equal to about 1:1. In the plurality of quantum dots (e.g., in the first quantum dots, in the second quantum dots, or in a combination thereof) according to an embodiment, a mole ratio of sulfur to selenium may be greater than or equal to about 0.05:1, greater than or equal to about 0.07:1, greater than or equal to about 0.1:1, greater than or equal to about 0.2:1, greater than or equal to about 0.3:1, greater than or equal to about 0.4:1, greater than or equal to about 0.5:1, greater than or equal to about 0.6:1, greater than or equal to about 0.7:1, greater than or equal to about 0.8:1, or greater than or equal to about 0.9:1.

In the second quantum dots according to an embodiment, a mole ratio of zinc to indium may be less than or equal to about 24:1, less than or equal to about 23:1, less than or equal to about 22:1, less than or equal to about 21:1, less than or equal to about 20:1, less than or equal to about 19:1, less than or equal to about 18:1, less than or equal to about 17:1, less than or equal to about 16:1, less than or equal to about 15:1, or less than or equal to about 14:1. In the first quantum dots according to an embodiment, a mole ratio of zinc to indium may be greater than or equal to about 3:1, greater than or equal to about 4:1, greater than or equal to about 5:1, greater than or equal to about 6:1, greater than or equal to about 7:1, greater than or equal to about 8:1, greater than or equal to about 9:1, greater than or equal to about 10:1, greater than or equal to about 11:1, greater than or equal to about 12:1, greater than or equal to about 13:1, greater than or equal to about 14:1, or greater than or equal to about 15:1.

In the second quantum dots, a mole ratio of phosphorus to indium may be greater than or equal to about 0.7:1, greater than or equal to about 0.75:1, greater than or equal to about 0.8:1, greater than or equal to about 0.85:1, or greater than or equal to about 0.9:1. In the second quantum dots, a mole ratio of phosphorus to indium may be less than or equal to about 1.5:1, less than or equal to about 1.4:1, less than or equal to about 1.3:1, less than or equal to about 1.2:1, less than or equal to about 1.1:1, or less than or equal to about 1:1. In an embodiment, the mole ratio of phosphorous to indium may be from about 0.7:1 to about 1:1, from about 0.8:1 to about 1.2:1, from about 0.85:1 to about 1.3:1, from about 0.9 to about 1, or a combination thereof.

In the light emitting layer, the first quantum dots, or the second quantum dots, a mole ratio of indium to a total moles of chalcogen element (e.g., a total sum of S and Se) may be greater than or equal to about 0.05:1, greater than or equal to about 0.06:1, or greater than or equal to about 0.07:1 and less than or equal to about 0.15:1, less than or equal to about 0.14:1, less than or equal to about 0.13:1, less than or equal to about 0.12:1, less than or equal to about 0.11:1, less than or equal to about 0.105:1, less than or equal to about 0.1:1, less than or equal to about 0.095, less than or equal to about 0.09:1, less than or equal to about 0.085:1, less than or equal to about 0.08:1, or less than or equal to about 0.075:1.

Figure 5:
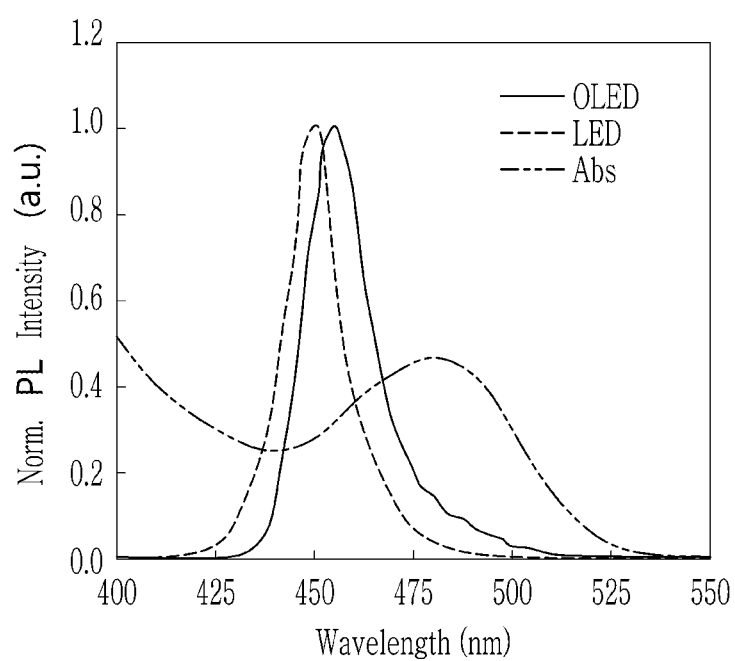
FIG. 5 is a graph of Norm. EL Intensity versus wavelength (nm) showing a photoluminescent spectrum and a UV-Vis absorption spectrum of the second quantum dots in a color filter of an embodiment.

In a UV-Vis absorption spectrum curve, the second quantum dots may exhibit a valley at, e.g., in, a wavelength range of less than or equal to about 450 nm and show, e.g., exhibit, a positive differential coefficient value at 450 nm (see the tangential slope at a wavelength of 450 nm in FIG. 5). In the UV-Vis absorption spectrum curve, the differential coefficient value at 450 nm may be greater than 0, for example, greater than or equal to about 0.001, greater than or equal to about 0.002, greater than or equal to about 0.003, greater than or equal to about 0.004, greater than or equal to about 0.005, or greater than or equal to about 0.006. The differential coefficient value may be less than or equal to about 0.03, less than or equal to about 0.025, less than or equal to about 0.02, less than or equal to about 0.015, less than or equal to about 0.01, less than or equal to about 0.0095, less than or equal to about 0.009, or less than or equal to about 0.0085. The differential coefficient value (i.e., a derivative of df(x)/dx, tangential slope) at 450 nm of the UV-Vis absorption curve may be measured by an analysis of the curve.

The second quantum dots may show, e.g., have, a UV-Vis absorption spectrum with an upward slope to the right (in other words, having a positive slope or a greater absorption with an increase of wavelength), at a wavelength of about 450 nm. The second quantum dots may exhibit improved light absorption properties for a blue organic light emitting diode (OLED) light source.

In an embodiments, the first quantum dots may show, e.g., exhibit, a quantum yield that is greater than the second quantum dots, for example, by at least about 1%, at least about 2%, at least about 3%, at least about 4%, at least about 5%, at least about 6%, at least about 7%, at least about 8%, at least about 9%, or at least about 10%. In an embodiment, the first quantum dots may have a quantum yield of greater than or equal to about 80%, greater than or equal to about 85%, greater than or equal to about 90%, greater than or equal to about 95%, or greater than or equal to about 97%. A quantum yield of the first quantum dots may be from about 80% to about 100%, from about 85% to about 99%, or from about 90% to about 97%. A quantum yield of the second quantum dots may be from about 70% to about 100%, from about 75% to about 95%, from about 80% to about 90%, from about 85% to about 89%, from about 83% to about 85%, or a combination thereof.

In an embodiment, the second quantum dots may show, e.g., exhibit, a blue light absorption that is greater than that of the first quantum dots for example, by at least 1%, at least about 2%, at least about 3%, at least about 4%, at least about 5%, at least about 6%, at least about 7%, at least about 8%, at least about 9%, or at least about 10%. In an embodiment, the second quantum dots may show, e.g., exhibit, a blue light absorption of greater than or equal to about 82%, for example, greater than or equal to about 86%, greater than or equal to about 90%, greater than or equal to about 94%, or greater than or equal to about 98%.

In an embodiment, the first quantum dots and the second quantum dots may exhibit maximum luminescent peak in a range of a green light wavelength in a photoluminescent spectrum. The green light wavelength may be greater than or equal to about 500 nm, greater than or equal to about 510 nm, greater than or equal to about 520 nm, or greater than or equal to about 530 nm. The green light wavelength may be, less than or equal to about 560 nm, less than or equal to about 550 nm, or less than or equal to about 540 nm.

The first quantum dots may have fwhm of a luminescent peak that is narrower than that of the second quantum dots by greater than or equal to about 1 nm, greater than or equal to about 2 nm, greater than or equal to about 3 nm, greater than or equal to about 4 nm, greater than or equal to about 5 nm, greater than or equal to about 6 nm, greater than or equal to about 7 nm, greater than or equal to about 8 nm, greater than or equal to about 9 nm, or greater than or equal to about 10 nm. The fwhm of the luminescent peak of the first quantum dots may be less than or equal to about 43 nm, for example, less than or equal to about 41 nm, less than or equal to about 39 nm, less than or equal to about 37 nm, less than or equal to about 35 nm, or less than or equal to about 34 nm. The fwhm of the first quantum dots may be greater than or equal to about 5 nm, greater than or equal to about 10 nm, greater than or equal to about 15 nm, greater than or equal to about 20 nm, greater than or equal to about 25 nm, or greater than or equal to about 30 nm.

The first quantum dots may have a photoluminescent tail area percentage that is less than that of the second quantum dots, for example, by at least 1%, at least about 2%, at least about 3%, at least about 4%, at least about 5%, at least about 6%, at least about 7%, at least about 8%, at least about 9%, at least about 10%, or at least about 20%. The first quantum dots may have a photoluminescent tail area percentage of less than or equal to about 20%, for example, less than or equal to about 15%, less than or equal to about 11%, less than or equal to about 10%, less than or equal to about 5%, or less than or equal to about 1%.

The photoluminescent tail may be a portion of a photoluminescent spectrum curve with a wavelength that is greater than a luminescent peak wavelength by at least about 35 nm, at least about 40 nm, at least about 41 nm, at least about 42 nm, at least about 43 nm, at least about 44 nm, at least about 45 nm, at least about 46 nm, at least about 47 nm, at least about 48 nm, at least about 49 nm, or at least about 50 nm. The photoluminescent tail may be a portion of a photoluminescent spectrum curve with a wavelength that is greater than about 580 nm.

A percentage of the photoluminescent tail may be calculated by the following equation:

(An area of photoluminescent tail/a total area of the luminescent spectrum)×100(%)

A difference between photoluminescent peak wavelengths of the first quantum dots and the second quantum dots may be greater than or equal to about 5 nm, greater than or equal to about 8 nm, greater than or equal to about 10 nm, greater than or equal to about 11 nm, greater than or equal to about 12 nm, greater than or equal to about 13 nm, greater than or equal to about 14 nm, greater than or equal to about 15 nm, greater than or equal to about 16 nm, greater than or equal to about 17 nm, greater than or equal to about 18 nm, greater than or equal to about 19 nm, or greater than or equal to about 20 nm. A difference between photoluminescent peak wavelengths of the first quantum dots and the second quantum dots may be from about 5 to about 50 nm, from about 8 to about 40 nm, from about 10 to about 30 nm, from about 12 to about 15 nm, or a combination thereof.

A difference between first absorption peak wavelengths of the first quantum dots and the second quantum dots in a UV-Vis absorption spectrum may be greater than or equal to about 5 nm, greater than or equal to about 8 nm, greater than or equal to about 10 nm, greater than or equal to about 11 nm, greater than or equal to about 12 nm, greater than or equal to about 13 nm, greater than or equal to about 14 nm, greater than or equal to about 15 nm, greater than or equal to about 16 nm, greater than or equal to about 17 nm, greater than or equal to about 18 nm, greater than or equal to about 19 nm, or greater than or equal to about 20 nm. A difference between first absorption peak wavelengths of the first quantum dots and the second quantum dots in a UV-Vis absorption spectrum may be from about 5 to about 50 nm, from about 8 to about 40 nm, from about 10 to about 30 nm, from about 12 to about 15 nm, or a combination thereof.

In an embodiment, the first quantum dots may have a photoluminescent peak wavelength of greater than or equal to about 500 nm, greater than or equal to about 510 nm, or greater than or equal to about 520 nm, and less than or equal to about 550 nm, less than or equal to about 540 nm, or less than or equal to about 530 nm. In an embodiment, a photoluminescent peak wavelength of the first quantum dots may be from about 500 nm to about 550 nm, from about 510 nm to about 540 nm, from about 520 nm to about 530 nm, or a combination thereof.

In an embodiment, the first quantum dots may have a first absorption peak wavelength of greater than or equal to about 470 nm, greater than or equal to about 480 nm, or greater than or equal to about 490 nm, and less than or equal to about 530 nm, less than or equal to about 520 nm, or less than or equal to about 510 nm. In an embodiment, a first absorption peak wavelength of the first quantum dots may be from about 470 nm to about 530 nm, from about 480 nm to about 520 nm, from about 490 nm to about 510 nm, or a combination thereof.

In an embodiment, the second quantum dots may have a photoluminescent peak wavelength of greater than or equal to about 480 nm, greater than or equal to about 490 nm, or greater than or equal to about 500 nm, and less than or equal to about 530 nm, less than or equal to about 520 nm, or less than or equal to about 510 nm. In an embodiment, a photoluminescent peak wavelength of the second quantum dots may be from about 480 nm to about 530 nm, for example, from about 490 nm to about 520 nm, from about 500 nm to about 510 nm, or a combination thereof.

In an embodiment, the second quantum dots may have a first absorption peak wavelength of greater than or equal to about 450 nm, greater than or equal to about 460 nm, or greater than or equal to about 470 nm, and less than or equal to about 500 nm, less than or equal to about 490 nm, or less than or equal to about 480 nm. In an embodiment, a first absorption peak wavelength of the second quantum dots may be from about 450 nm to about 500 nm, from about 460 nm to about 490 nm, from about 470 nm to about 480 nm, or a combination thereof.

Figure 3:
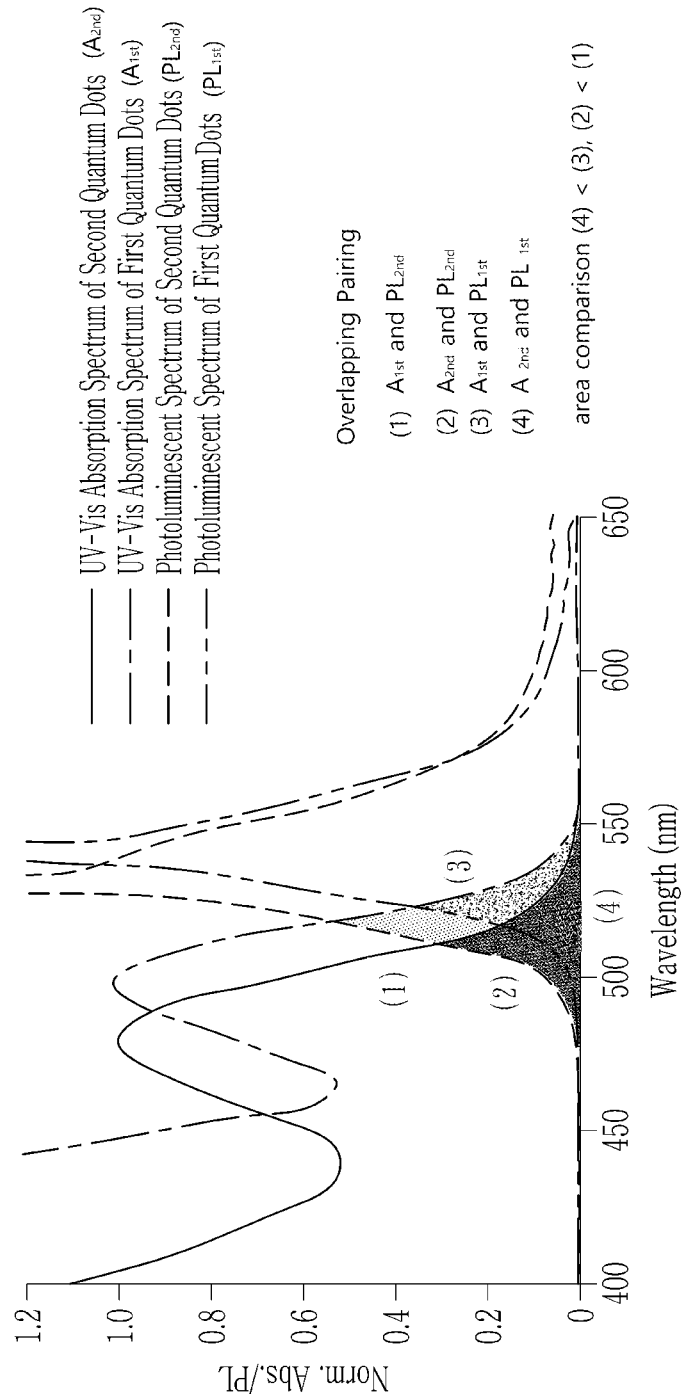
FIG. 3 is a graph of normalized absorption and photoluminescence (Norm. Abs./PL) versus wavelength (nm) showing photoluminescent spectrums and UV-Vis absorption spectrums of the first quantum dots and the second quantum dots in a color filter of an embodiment.

FIG. 3 shows photoluminescent spectrums and UV-Vis absorption spectrums of the first quantum dots and the second quantum dots together. Referring to FIG. 3, in an embodiment, the first absorption peak wavelength of the second quantum dots may be less than the first absorption peak wavelength of the first quantum dots and the photoluminescent peak wavelength of the second quantum dots may be greater than the first absorption peak wavelength of the first quantum dots and less than the photoluminescent peak wavelength of the first quantum dots.

In an embodiment, the overlapping area (4) of the UV-Vis absorption spectrum of the second quantum dots and the photoluminescent spectrum of the first quantum dot may be less than the overlapping area (2) of the UV-Vis absorption spectrum of the second quantum dots and the photoluminescent spectrum of the second quantum dot or the overlapping area (3) of the UV-Vis absorption spectrum of the first quantum dots and the photoluminescent spectrum of the first quantum dot.

In addition, the overlapping area (2) of the UV-Vis absorption spectrum of the second quantum dots and the photoluminescent spectrum of the second quantum dot or the overlapping area (3) of the UV-Vis absorption spectrum of the first quantum dots and the photoluminescent spectrum of the first quantum dot may be greater than the overlapping area (1) of the UV-Vis absorption spectrum of the first quantum dots and the photoluminescent spectrum of the second quantum dot.

In an embodiment, the photoluminescent spectrum of the first quantum dots and the UV-Vis absorption spectrum of the second quantum dots may be overlapped, e.g., may overlap one another, and the photoluminescent spectrum of the second quantum dots and the UV-Vis absorption spectrum of the first quantum dots may be overlapped, e.g., may overlap one another. In addition, without wishing to be bound by any theory, it is understood that the overlapping area (1) of the UV-Vis absorption spectrum of the first quantum dots and the photoluminescent spectrum of the second quantum dot may be greater than any other overlapping areas and whereby for the first quantum dots having a relatively long luminescent wavelength, an unwanted absorption of a front or forward emission thereof may be suppressed and for the second quantum dots having a relatively short luminescent wavelength, a recycling of the backward light or emission may increase.

In an embodiment, each of the first quantum dots and the second quantum dots may have a core shell structure including a semiconductor nanocrystal core and a semiconductor nanocrystal shell disposed on the semiconductor nanocrystal core. The semiconductor nanocrystal shell may include a first shell layer disposed on the core and a second shell layer disposed on the first shell layer.

In an embodiment, a thickness of the semiconductor nanocrystal shell (e.g., the first shell layer, the second shell layer, or a combination thereof) of the first quantum dots may be different from a thickness of the semiconductor nanocrystal shell (e.g., the first shell layer, the second shell layer, or a combination thereof) of the second quantum dots.

In an embodiment, the first quantum dots may have a size (or an average size) that is greater than that of the second quantum dots by greater than or equal to about 1.0 nm, greater than or equal to about 1.1 nm, greater than or equal to about 1.2 nm, greater than or equal to about 1.3 nm, greater than or equal to about 1.4 nm, greater than or equal to about 1.5 nm, greater than or equal to about 1.6 nm, greater than or equal to about 1.7 nm, greater than or equal to about 1.8 nm, greater than or equal to about 1.9 nm, or greater than or equal to about 2.0 nm.

A difference between the (average) size of the first quantum dots and the (average) size of the second quantum dots may be less than or equal to about 5 nm, less than or equal to about 4 nm, less than or equal to about 3 nm, less than or equal to about 2.5 nm, or less than or equal to about 2 nm.

In an embodiment, the first quantum dots may have a size (or an average size) of greater than or equal to about 5.0 nm, greater than or equal to about 5.5 nm, greater than or equal to about 6.0 nm, or greater than or equal to about 6.5 nm, and less than or equal to about 10.0 nm, less than or equal to about 9.0 nm, less than or equal to about 8.0 nm, or less than or equal to about 7.0 nm. In an embodiment, a size (or an average size) of the first quantum dots may be from about 5.0 nm to about 10.0 nm, from about 5.5 nm to about 9.0 nm, from about 6.0 nm to about 8.0 nm, from about 6.5 nm to about 7.0 nm, or a combination thereof.

In an embodiment, the second quantum dots may have a size (or an average size) of greater than or equal to about 2.0 nm, greater than or equal to about 2.5 nm, greater than or equal to about 3.0 nm, greater than or equal to about 3.5 nm, or greater than or equal to about 4.0 nm, and less than or equal to about 8.0 nm, less than or equal to about 7.0 nm, less than or equal to about 6.0 nm, less than or equal to about 5.0 nm, less than or equal to about 5.5 nm, or less than or equal to about 4.5 nm. In an embodiment, a size (or an average size) of the first quantum dots may be from about 2.0 nm to about 8.0 nm, from about 2.5 nm to about 7.0 nm, from about 3.0 nm to about 6.0 nm, from about 3.5 nm to about 5.0 nm, or from about 4.0 nm to about 4.5 nm, or a combination thereof.

In an embodiment, the size of the quantum dot may be a diameter. In an embodiment the size of the quantum dot may be an equivalent diameter obtained from a two-dimensional image of an electron microscopy analysis (e.g., under an assumption of a circle). In an embodiment, the size of the quantum dots may be measured from an average value of the major axis and the minor axis.

A shape of the quantum dot(s) is not particularly limited. The shape of the quantum dot may include a sphere, a polygon, a pyramid, a multi-pod, a cube, a nanotube, a nanowire, a nanosheets, a nano platelet, or a combination thereof, but is not limited thereto.

In an embodiment, a first shell layer thickness of the first quantum dots may be at least about 0.5 times, at least about 0.6 times, at least about 0.7 times, or at least about 0.8 times and at most about 1.5, at most about 1.4 times, at most about 1.3 times, at most about 1.2 times, at most about 1.1 times, or at most about 0.9 times, the size of the semiconductor nanocrystal core. In an embodiment, a first shell layer thickness of the first quantum dots may be from about 0.5 times to about 1.5 times, from about 0.6 times to about 1.4 times, from about 0.7 times to about 1.3 times, from about 0.8 times to about 1.2 times, or a combination thereof, the size of the semiconductor nanocrystal core.

In an embodiment, a second shell layer thickness of the first quantum dots may be at least about 0.05 times, at least about 0.06 times, at least about 0.07 times, at least about 0.08 times, at least about 0.09 times, at least about 0.10 times, at least about 0.11 times, at least about 0.12 times, or at least about 0.13 times, and at most about 0.3 times, at most about 0.25 times, at most about 0.20 times, or at most about 0.15 times, the size of the semiconductor nanocrystal core. In an embodiment, a second shell layer thickness of the first quantum dots may be from about 0.05 times to about 0.3 times, from about 0.06 times to about 2.5 times, from about 0.08 times to about 2.0 times, from about 0.10 times to about 1.5 times, or a combination thereof, the size of the semiconductor nanocrystal core.

In an embodiment, a first shell layer thickness of the second quantum dots may be at least about 0.1 times, at least about 0.15 times, at least about 0.2 times, at least about 0.25 times, or at least about 0.28 times, and at most about 0.6 times, at most about 0.5 times, at most about 0.4 times, or at most about 0.3 times, the size of the semiconductor nanocrystal core. In an embodiment, a first shell layer thickness of the second quantum dots may be from about 0.1 times to about 0.6 times, from about 0.15 times to about 0.5 times, from about 0.2 times to about 0.4 times, or from about 0.25 times to about 0.3 times, or a combination thereof, the size of the semiconductor nanocrystal core.

In an embodiment, a first shell layer thickness of the second quantum dots may be at least about 0.1 times, at least about 0.15 times, at least about 0.2 times, at least about 0.25 times, or at least about 0.28 times, and at most about 0.6 times, at most about 0.5 times, at most about 0.4 times, or at most about 0.3 times, the size of the semiconductor nanocrystal core. In an embodiment, a first shell layer thickness of the second quantum dots may be from about 0.1 times to about 0.6 times, from about 0.15 times to about 0.5 times, from about 0.2 times to about 0.4 times, from about 0.25 times to about 0.3 times, or a combination thereof, the size of the semiconductor nanocrystal core.

The semiconductor nanocrystal core may include a Group III-V compound, including InP, InAs, GaP, GaAs, or a combination thereof. The semiconductor nanocrystal core may include indium and phosphorus. The semiconductor nanocrystal core may further include zinc.

The semiconductor nanocrystal core may further include a Group IV compound. The Group IV compound may include tin (Sn).

A size (or an average size) of the semiconductor nanocrystal core may be selected taking into consideration a photoluminescent wavelength of the quantum dots. In an embodiment, the size (or the average size) of the semiconductor nanocrystal core may be greater than or equal to about 1 nm, greater than or equal to about 1.1 nm, greater than or equal to about 1.2 nm, greater than or equal to about 1.3 nm, greater than or equal to about 1.4 nm, greater than or equal to about 1.5 nm, greater than or equal to about 1.6 nm, greater than or equal to about 1.7 nm, greater than or equal to about 1.8 nm, greater than or equal to about 1.9 nm, or greater than or equal to about 2 nm. In an embodiment, the size (or the average size) of the semiconductor nanocrystal core may be less than or equal to about 5 nm, less than or equal to about 4.5 nm, less than or equal to about 4 nm, less than or equal to about 3.5 nm, or less than or equal to about 3 nm.

In an embodiment, the first quantum dots, the second quantum dots, or the first quantum dots and the second quantum dots (hereinafter, "quantum dots") may have a core multilayered shell structure. In an embodiment, the shell may include a first semiconductor nanocrystal shell layer including zinc, selenium, and optionally sulfur. In an embodiment, the shell may include a second semiconductor nanocrystal shell layer including zinc and sulfur, disposed on the first semiconductor nanocrystal shell layer. In an embodiment, the quantum dots may include a first semiconductor nanocrystal shell layer directly on the semiconductor nanocrystal core, the first semiconductor nanocrystal shell layer including ZnSe, ZnSeS, or a combination thereof; and further a second semiconductor nanocrystal shell layer disposed on the first semiconductor nanocrystal shell layer and including ZnS, ZnSeS, or a combination thereof.

The first semiconductor nanocrystal shell layer of the first quantum dots may include zinc and selenide (e.g., ZnSe) and optionally may or may not include sulfur. In an embodiment, the first semiconductor nanocrystal shell layer of the first quantum dots may or may not include ZnSeS. In an embodiment, the first semiconductor nanocrystal shell layer of the second quantum dots may include zinc, selenide, and sulfur (e.g., ZnSeS).

The first semiconductor nanocrystal shell layer may be disposed directly on the semiconductor nanocrystal core. The second semiconductor nanocrystal shell layer may be disposed on or directly on the first semiconductor nanocrystal shell layer. The second semiconductor nanocrystal shell layer may be an outermost layer of the quantum dots. The second semiconductor nanocrystal shell layer may include ZnSeS, ZnS, or a combination thereof.

The shell or the second semiconductor nanocrystal shell layer may have a composition varying in a radial direction. The second semiconductor nanocrystal shell layer may have a concentration gradient wherein a sulfur concentration increases in a direction from the core toward a surface of the quantum dot.

In an embodiment, the first quantum dots include a semiconductor nanocrystal core including an indium phosphide optionally with zinc and the first semiconductor nanocrystal shell layer including ZnSe, and the second semiconductor nanocrystal shell layer including ZnS.

Among quantum dots not including toxic heavy metal such as Cd and Pb, an indium phosphide based quantum dot may exhibit a luminous efficiency, a fwhm, and a stability for use in a luminescent color filter. In order to be used in the color filter, a quantum dot may undergo a pattern forming process involving the use of a photoresist or an ink composition and a high temperature baking, during which the quantum dot may suffer a surface damage and may show, e.g., exhibit, a substantial decrease of luminous efficiency. In the color filter of an embodiment, the first quantum dots each having a relatively thick shell including a ZnSe and ZnS may contribute to minimizing or limiting an effect of the damage(s) (e.g., the surface damage) of the photoresist or ink process exerted on the semiconductor nanocrystal core for its luminous property.

In the color filter of an embodiment, the second quantum dots may include a semiconductor nanocrystal core including an indium phosphide optionally with zinc and a first semiconductor nanocrystal shell layer including a zinc selenide sulfide and a second semiconductor nanocrystal shell layer including a zinc sulfide. In the color filter of an embodiment, the second quantum dots each having a controlled shell thickness may contribute to optimizing a blue light absorption improvement as a feature of a color filter. In the second quantum dots, a thickness of a shell component may be controlled to achieve a higher, e.g., greater, blue light absorption of the color filter.

Figure 4:
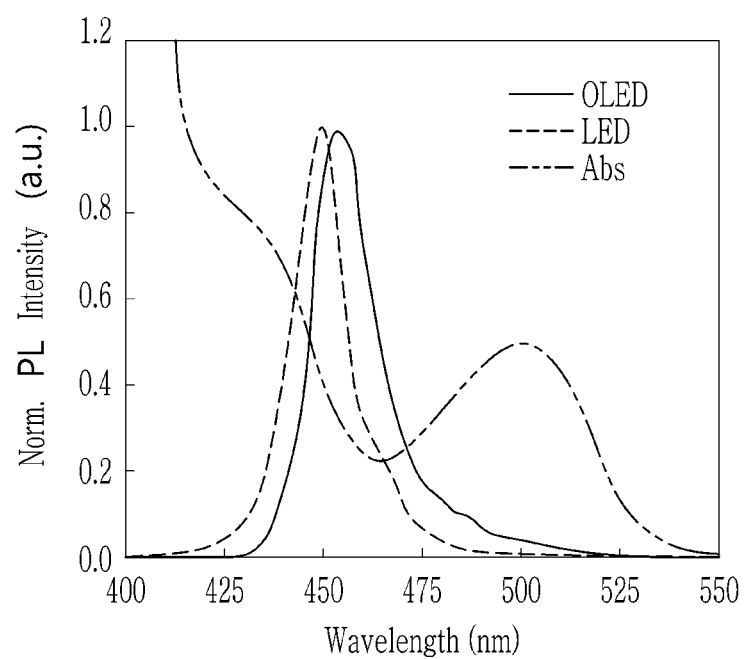
FIG. 4 is a graph of normalized electroluminescent intensity (Norm. EL Intensity) versus wavelength (nm) showing a photoluminescent spectrum and a UV-Vis absorption spectrum of the first quantum dots in a color filter of an embodiment.

FIG. 4 is a view showing the graphs of the photoluminescent spectrum and the UV-Vis absorption spectrum of the first quantum dots and FIG. 5 is a view showing the graphs of the photoluminescent spectrum and the UV-Vis absorption spectrum of the second quantum dots. In FIG. 4 and FIG. 5, "OLED" is a photoluminescent spectrum obtained by using an OLED as a light source and "LED" is a photoluminescent spectrum obtained by using a light emitting diode (LED) as a light source, and "Abs" is a UV-Vis absorption spectrum.

Referring to FIG. 4, the first quantum dots may show, e.g., exhibit, an absorption at 450 nm different from the second quantum dots. When the light source is an OLED, the blue light peak may shift toward a longer, e.g., greater, wavelength (e.g., from about 449 nm to about 460 nm), and may show, e.g., exhibit, a blue light longer wavelength tail. The absorption peak of the first quantum dots may exhibit a downward slope as the wavelength increases in this range, and may cause a greater decrease in the blue light absorption with the OLED light source than with the LED light source. In an embodiment, the first quantum dots may show, e.g., exhibit, a blue light absorption (e.g., about 84% for example, for 10 μm thick ink composition) with, e.g., using, a 450 nm incident light, that is significantly lower than a blue light absorption ratio with, e.g., using, a 465 nm incident light (e.g., for about 76%) for example by at least about 5%, about 6%, about 7%, or about 8%.

Referring to FIG. 5, the second quantum dots may have an UV-Vis absorption spectrum having an upward slope with an increase of wavelength in this region for example, at 450 nm, and the second quantum dots may exhibit a higher, e.g., greater, blue light absorption for, e.g., of, a blue light OLED source than for a blue light LED source. In an embodiment, the second quantum dots may show, e.g., exhibit, a blue light absorption (e.g., about 91% for example, for 10 μm thick ink composition) with, e.g., using, a 450 nm incident light and a higher, e.g., greater, blue light absorption with, e.g., using, a 465 nm incident light (e.g., for about 94%) for example by at least about 1%, about 2%, about 3%, or about 4%.

In comparison with the first quantum dots, the second quantum dots may show, e.g., exhibit, a blue light absorption that is higher, e.g., greater, by 8% when using the LED light source (e.g., at an excitation with light having a wavelength about 450 nm) and by 24% when using the OLED light source (at an excitation having a wavelength about 465 nm).

Taking into consideration the incident light absorption, the second quantum dots may provide higher, e.g., greater, technological advantage than the first quantum dots. The second quantum dots may have a smaller size and a thinner shell than the first quantum dots, and the present inventors have surprisingly found that a color filter based on the second quantum dots only may exhibit lower quantum efficiency and a device's spectrum cut due to a larger tail emission, and a lower thermal stability at 80° C. during an operation than the color filter including the first quantum dots. Accordingly, the first quantum dots may show, e.g., exhibit, a higher, e.g., greater, internal conversion (e.g., about 38%) than the second quantum dots (e.g., showing, e.g., exhibiting, about 36%) and an absolute quantum yield of the first quantum dots may be higher, e.g., greater (e.g., about 97%), than the second quantum dots (e.g., about 89%).

Without wishing to be bound by any theory, it is understood that a color filter based on the second quantum dots only may exhibit a longer wavelength tail emission at a wavelength longer, e.g., greater, than 580 nm, for example, due to a surface trap and when a device further includes an excitation light cut filter, the photoluminescent spectrum of the second quantum dots may be cut thereby. The present inventors have surprisingly found that in the aforementioned case, the technological features (e.g., the high blue light absorption and high photoconversion feature) that can be achieved by adopting the second quantum dots in the luminescent color filter may be suppressed in the device.

In addition, without wishing to be bound by any theory, it is understood that, the excitation occurring at the upward increasing portion of the absorption spectrum of the second quantum dots may further increase a contribution of the second quantum dots for the given absorption region, whereby the full width at half maximum of the photoluminescent peak of the color filter may be further widened. Therefore, when being used in a color filter, the film including the second quantum dots only may exhibit a relatively wide luminescent peak (e.g., as wide as about 43 nm), which may in turn deteriorate the color purity of the display device including the color filter. The wide fwhm may further deteriorate a color reproducibility of a display device. The present inventors have surprisingly found that according to an embodiment including the layered structure recited herein, the aforementioned issues can be addressed.

In addition, the color filter of an embodiment may further achieve an improvement in terms of thermal stability. In an embodiment, on the operation at a high temperature of about 80° C., a color filter including the second quantum dots only may show, e.g., exhibit, a decrease of efficiency by about 10% or higher, e.g., greater, but the color filter of an embodiment may exhibit a decrease of from about 2% to about 4%, which is less than the color filter including the second quantum dots only.

In an embodiment, the color filter include the light emitting layer including a first layer including the first quantum dots and a second layer including the second quantum dots, and according to the structure recited herein, the first quantum dots having a relatively long luminescent peak wavelength may exhibit a reduced reabsorption of a front or forward emission and the second quantum dots having a relatively shorter luminescent wavelength may increase a recycling of a backward emission, whereby a luminescent contribution of the first quantum dots may increase and the color filter may exhibit a relatively high luminescent efficiency and a narrower fwhm together with a reduced tail emission, realizing, e.g., exhibiting, a high color purity.

The first layer and the second layer may be prepared in a form of a sheet or a patterned film. The first layer may include a polymer matrix and, the first quantum dots are dispersed in the polymer matrix. The second layer may include a polymer matrix and, the second quantum dots are dispersed in the polymer matrix The polymer matrix may include a thiolene polymer, a linear or crosslinked, substituted or unsubstituted poly (meth)acrylate, a linear or crosslinked, substituted or unsubstituted polyurethane, a linear or crosslinked epoxy polymer, a linear or crosslinked, substituted or unsubstituted vinyl polymer, a linear or crosslinked silicone resin, or a combination thereof.

The polymer matrix may include a crosslinked polymer, a binder compound (monomer or polymer) having a carboxylic acid, or a combination thereof. The crosslinked polymer may include a thiolene polymer, a crosslinked poly(meth)acrylate, a crosslinked polyurethane, a crosslinked epoxy resin, a crosslinked vinyl polymer, a crosslinked silicone resin, or a combination thereof.

In an embodiment, the polymer matrix may include a binder compound, a polymerization product (e.g., an insulating polymer) of a (e.g., at least one, for example, at least two, at least three, at least four, or at least five), polymerizable monomer(s) having a (e.g., at least one, for example, at least two, at least three, at least four, or at least five) carbon-carbon double bond(s), optionally a polymerization product of the polymerizable monomer and a thiol compound (e.g., a polythiol compound having at least two thiol groups for example, at a terminal end thereof), or a combination thereof.

The linear polymer may include a repeating unit derived from carbon-carbon unsaturated bonds (e.g., carbon-carbon double bond). The repeating unit may include a carboxylic acid group. The linear polymer may include an ethylene repeating unit.

In an embodiment, the first layer, the second layer, or a combination thereof may further include various additives such as a light diffusing agent, a leveling agent, or a coupling agent in addition to the aforementioned components. The amount of the additive is not particularly limited, and may be selected within an appropriate range wherein the additive does not cause an adverse effect on the photosensitive composition and the pattern obtained therefrom. Materials for the additives are not particularly limited and any substance, material, or combination thereof playing a desired role may be used.

In the first layer or in the second layer, an amount of the first quantum dots or an amount of the second quantum dots may be each independently, based on a total weight of the first layer or the second layer, greater than or equal to about 3 weight percent (wt %), greater than or equal to about 5 wt %, greater than or equal to about 7 wt %, greater than or equal to about 8 wt %, greater than or equal to about 9 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, or greater than or equal to about 40 wt %. In the first layer or in the second layer, an amount of the first quantum dots or an amount of the second quantum dots may be each independently, based on a total weight of the first layer or the second layer, less than or equal to about 70 wt %, less than or equal to about 65 wt %, less than or equal to about 60 wt %, less than or equal to about 55 wt %, or less than or equal to about 50 wt %.

In the light emitting layer, an amount of the quantum dots (first quantum dots and the second quantum dots) may be, based on a total weight of the light emitting layer, greater than or equal to about 7 wt %, greater than or equal to about 8 wt %, greater than or equal to about 9 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, or greater than or equal to about 40 wt % and less than or equal to about 95 wt %, less than or equal to about 90 wt %, less than or equal to about 80 wt %, less than or equal to about 70 wt %, less than or equal to about 65 wt %, less than or equal to about 60 wt %, less than or equal to about 55 wt %, or less than or equal to about 50 wt %.

In an embodiment, the color filter or the light emitting layer (e.g., a combination of the first layer and the second layer) may be in a form of a film, the film have a thickness of less than or equal to about 200 micrometers (μm), less than or equal to about 190 μm, less than or equal to about 180 μm, less than or equal to about 170 μm, less than or equal to about 160 μm, less than or equal to about 150 μm, less than or equal to about 140 μm, less than or equal to about 130 μm, less than or equal to about 120 μm, less than or equal to about 110 μm, less than or equal to about 100 μm, less than or equal to about 90 μm, less than or equal to about 80 μm, less than or equal to about 70 μm, less than or equal to about 60 μm, less than or equal to about 50 μm, less than or equal to about 40 μm, less than or equal to about 30 μm, less than or equal to about 20 μm, less than or equal to about 10 μm, less than or equal to about 8 μm, or less than or equal to about 7 μm and greater than or equal to about 2 μm, greater than or equal to about 3 μm, greater than or equal to about 3.5 μm, greater than or equal to about 4 μm, greater than or equal to about 5 μm, greater than or equal to about 6 μm, greater than or equal to about 7 μm, greater than or equal to about 8 μm, greater than or equal to about 9 μm, greater than or equal to about 10 μm, greater than or equal to about 11 μm, greater than or equal to about 12 μm, greater than or equal to about 13 μm, greater than or equal to about 14 μm, greater than or equal to about 15 μm, greater than or equal to about 16 μm, greater than or equal to about 17 μm, greater than or equal to about 18 μm, greater than or equal to about 19 μm, or greater than or equal to about 20 μm.

In an embodiment, a ratio between a thickness of the first layer and the second layer may be 1:0.1 to 1:10, 1:0.2 to 1:9, 1:0.3 to 1:8; 1:0.4 to 1:7, 1:0.5 to 1:6, 1:0.6 to 1:5, 1:0.7 to 1:4, 1:0.8 to 1:3, 1:0.9 to 1:2, 1:1 to 1:1.5, or a combination thereof. In an embodiment, a thickness ratio between the first layer and the second layer may be 7.5:2.5 to 2.5:7.5, 7.0:3.0 to 3.0:7.0, 6.5:3.5 to 3.5:6.5, 6.0:4.0 to 4.0:6.0, 5.5:4.5 to 4.5:5.5, or a combination thereof.

Figure 6:
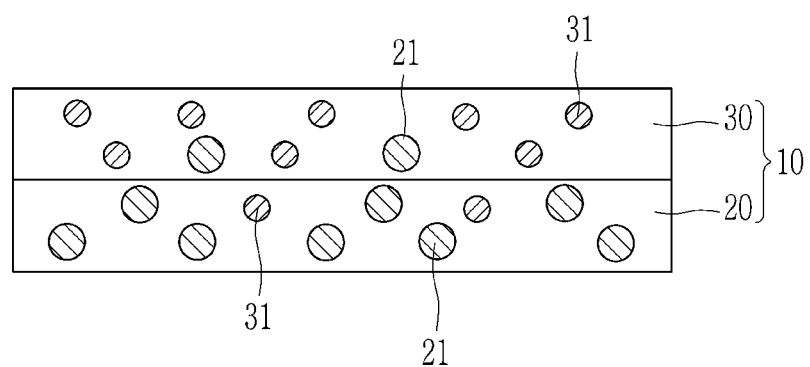
FIG. 6 shows a schematic view of a color filter according to an embodiment.

FIG. 6 is a cross-section view illustrating a color filter of an embodiment.

Referring to FIG. 6, the first layer 20 or the second layer 30 include the first quantum dots 21 and the second quantum dots 31. In an embodiment, the first layer 20 may include the first quantum dots 21 in a greater amount than the second quantum dots 31, and the second layer 30 may include the second quantum dots 31 in a greater amount than the first quantum dots 21. In the light emitting layer of an embodiment, an amount of the first quantum dots 21 may gradually increase and an amount of the second quantum dots 31 may gradually decrease in a direction from the first layer 20 toward the second layer 30.

In an embodiment, the color filter may be prepared by preparing a first composition including the first quantum dots and a second composition including the second quantum dots, respectively, and forming a film or pattern from the first quantum dots and then forming a film or pattern from the second composition thereon. The order of forming the first layer or the second layer may be selected appropriately. In an embodiment, the first layer is formed and then the second layer is formed on the first layer. In an embodiment, the second layer is formed and the first layer is formed on the second layer.

Each of the first quantum dot population and the second quantum dot population may be prepared by a colloidal synthesis, respectively. Thus, the plurality of quantum dots may include and organic ligand, the organic solvent, or a combination thereof which will be described herein, on its surface. The organic ligand, the organic solvent, or the combination thereof may be bound to the surfaces of the quantum dots.

In an embodiment, the second quantum dots may be prepared by preparing semiconductor nanocrystal core including indium (In) and phosphorus (P), and optionally zinc; and reacting a zinc shell precursor and a selenium precursor, a sulfur precursor, or a combination thereof in the presence of the core and a first organic ligand (e.g., in an organic solvent) simultaneously or sequentially to form a semiconductor nanocrystal shell including zinc, selenium, and sulfur on the semiconductor nanocrystal core.

The forming of the shell may include heating a mixture including a zinc shell precursor, a first organic ligand, and an organic solvent; injecting the semiconductor nanocrystal core into the heated mixture, and injecting a selenium precursor and a sulfur precursor to form a shell having a desired composition (for example, independently once or more or twice or more) to perform a reaction. The injection method of each precursor is not particularly limited, and may be performed simultaneously (collectively) or sequentially. The forming of the shell may include forming a first semiconductor nanocrystal shell including zinc, sulfur, and selenium on the semiconductor nanocrystal core and forming a second semiconductor nanocrystal shell including zinc and sulfur, and selenium as desired, on the first semiconductor nanocrystal shell.

In an embodiment, the first quantum dots may be prepared by:

heating a mixture including a zinc precursor, an organic ligand, and an organic solvent;

adding the core and a selenium precursor to the heated mixture and then heating the same at a reaction temperature for at least about 40 minutes, for example, at least about 50 minutes to a shell including zinc and selenium formed on the core; and adding a sulfur containing precursor (e.g., a stock solution including the sulfur containing precursor) into the mixture at the reaction temperature and carrying out a reaction to form a ZnS shell on the ZnSe shell.

During the formation of the shell, an amount of each of the precursors (e.g., the zinc precursor, the selenium precursor, the sulfur precursor, or a combination thereof) may be controlled so that each of the resulting quantum dot populations may have a desired shell composition and structure together with a particle size and a distribution thereof.

The preparing of the semiconductor nanocrystal core may include heating an indium compound in the presence of a second organic ligand and an organic solvent to prepare an indium precursor solution; and injecting a phosphorus precursor into the indium precursor solution and heating the obtained mixture. The method may further include obtaining a zinc precursor prior to preparing an indium precursor solution, and preparing the indium precursor solution in the presence of the zinc precursor. Depending on the type(s), the zinc precursor may be obtained by heating a zinc compound and an organic ligand at a high temperature (for example, a temperature of greater than or equal to about 100° C. and less than or equal to about 200° C.) in an organic solvent. During the core synthesis, a mole ratio of zinc to indium may be greater than or equal to about 1:1, greater than or equal to about 1.1:1, or greater than or equal to about 1.2:1, and less than or equal to about 3:1, less than or equal to about 2.5:1, or less than or equal to about 2:1.

In an embodiment, the zinc precursor and the indium precursor may include a carboxylate moiety. A mole amount of the carboxylic acid-containing organic ligand relative to 1 mole of the metal in the zinc precursor (or the indium precursor) may be greater than or equal to about 1 mole, greater than or equal to about 1.5 moles, or greater than or equal to about 2 moles, and less than or equal to about 5 moles, less than or equal to about 4 moles, or less than or equal to about 3 moles.

The types of zinc precursor or zinc shell precursor (hereinafter referred to as zinc precursor) are not particularly limited and may be appropriately selected. For example, the zinc precursor may be a Zn metal powder, an alkylated Zn compound, Zn alkoxide, Zn carboxylate, Zn nitrate, Zn perchlorate, Zn sulfate, Zn acetylacetonate, Zn halide, Zn cyanide, Zn hydroxide, Zn oxide, Zn peroxide, or a combination thereof. The zinc precursor may be dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, and the like. The zinc precursors may be used alone or in combination of two or more, e.g., two or more different zinc precursors may be used.

The organic ligand may include RCOOH, $RNH_2$, $R_2NH$, $R_3N$, RSH, $RH_2PO$, $R_2HPO$, $R_3PO$, $RH_2P$, $R_2HP$, $R_3P$, ROH, RCOOR', $RPO(OH)_2$, RHPOOH, $R_2POOH$ (wherein, R and R' are independently a C1 to C40 (or a C3 to C24) aliphatic hydrocarbon group (e.g., alkyl group, alkenyl group alkynyl group), or a C6 to C40 (or a C6 to C24) aromatic hydrocarbon group (e.g., a C6 to C20 aryl group)), or a combination thereof.

The organic ligand may coordinate, e.g., bind to, the surface of the obtained nanocrystal and may improve upon the dispersion of nanocrystal in the solution, effect the light emitting and electrical characteristics of the quantum dots, or a combination thereof. Examples of the organic ligand may include methane thiol, ethane thiol, propane thiol, butane thiol, pentane thiol, hexane thiol, octane thiol, dodecane thiol, hexadecane thiol, octadecane thiol, benzyl thiol; methane amine, ethane amine, propane amine, butyl amine, pentyl amine, hexyl amine, octyl amine, dodecyl amine, hexadecyl amine, octadecyl amine, dimethyl amine, diethyl amine, dipropyl amine; methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid; a phosphine such as a substituted or unsubstituted methyl phosphine (e.g., trimethyl phosphine, methyldiphenyl phosphine, etc.), a substituted or unsubstituted ethyl phosphine (e.g., triethyl phosphine, ethyldiphenyl phosphine, etc.), a substituted or unsubstituted propyl phosphine, a substituted or unsubstituted butyl phosphine, a substituted or unsubstituted pentyl phosphine, a substituted or unsubstituted octyl phosphine (e.g., trioctyl phosphine (TOP)), and the like; a phosphine oxide such as a substituted or unsubstituted methyl phosphine oxide (e.g., trimethyl phosphine oxide, methyldiphenyl phosphine oxide, etc.), a substituted or unsubstituted ethyl phosphine oxide (e.g., triethyl phosphine oxide, ethyldiphenyl phosphine oxide, etc.), a substituted or unsubstituted propyl phosphine oxide, a substituted or unsubstituted butyl phosphine oxide, a substituted or unsubstituted octylphosphine oxide (e.g., trioctylphosphine oxide (TOPO)), and the like; a diphenyl phosphine, a triphenyl phosphine compound, or an oxide compound thereof; phosphonic acid, a C5 to C20 alkylphosphinic acid such as hexylphosphinic acid, octylphosphinic acid, dodecanephosphinic acid, tetradecanephosphinic acid, hexadecanephosphinic acid, or octadecanephosphinic acid, or a C5 to C20 alkyl phosphonic acid but is not limited thereto. The organic ligand may be used alone or as a mixture of two or more, e.g., two or more different organic ligands may be used.

The organic solvent may be, for example, a C6 to C22 primary amine such as hexadecylamine; a C6 to C22 secondary amine such as dioctylamine; a C6 to C40 tertiary amine such as trioctylamine; a nitrogen-containing heterocyclic compound such as pyridine; a C6 to C40 aliphatic hydrocarbon group (e.g., alkane, alkene, alkyne, etc.) such as hexadecane, octadecane, octadecene, or squalane; a C6 to C30 aromatic hydrocarbon group such as phenyldodecane, phenyltetradecane, or phenyl hexadecane; a phosphine substituted with a C6 to C22 alkyl group such as trioctylphosphine; a phosphine oxide substituted with a C6 to C22 alkyl group such as trioctylphosphine oxide; a C12 to C22 aromatic ether such as phenyl ether, or benzyl ether, or a combination thereof. Types and amounts of the solvent may be appropriately selected taking into consideration precursors and organic ligands.

The type of the indium compound is not particularly limited and may be appropriately selected. The indium precursor may include an indium powder, alkylated indium compound, indium alkoxide, indium carboxylate, indium nitrate, indium perchlorate, indium sulfate, indium acetylacetonate, indium halide, indium cyanide, indium hydroxide, indium oxide, indium peroxide, indium carbonate, or a combination thereof. The indium precursor may include an indium carboxylate such as indium oleate and indium myristate, indium acetate, indium hydroxide, indium chloride, indium bromide, and indium iodide. The forming of the indium precursor may be performed under vacuum at a temperature of greater than or equal to about 100° C., for example, greater than or equal to about 120° C., and less than or equal to about 200° C.

The type of the phosphorus precursor is not particularly limited and may be appropriately selected. The phosphorus precursor may include tris(trimethylsilyl) phosphine, tris (dimethylamino)phosphine, triethylphosphine, tributylphosphine, trioctylphosphine, triphenylphosphine, tricyclohexylphosphine, dimethylaminophosphine, diethylaminophosphine, or a combination thereof.

The mixture obtained by injecting the phosphorus precursor during the core formation process may be heated to a temperature of greater than or equal to about 150° C., greater than or equal to about 200° C., greater than or equal to about 250° C., or greater than or equal to about 270° C. and less than or equal to about 300° C., less than or equal to about 290° C., less than or equal to about 280° C., less than or equal to about 270° C., or less than or equal to about 260° C. In the core formation process a precursor, e.g., one or more of the precursors (e.g., an indium precursor, a phosphorus precursor, a zinc precursor, or a combination thereof), may be additionally injected once or more as desired.

The core formation reaction time is not particularly limited, and may be appropriately selected in consideration of reactivity between precursors and core formation temperature.

The type of the selenium precursor is not particularly limited and may be appropriately selected. For example, the selenium precursor may be selenium-trioctylphosphine (Se-TOP), selenium-tributylphosphine (Se-TBP), selenium-triphenylphosphine (Se-TPP), selenium-diphenylphosphine (Se-DPP), or a combination thereof. The selenium precursor may be injected once or more (e.g., two or more times).

The type of the sulfur precursor is not particularly limited and may be appropriately selected. The sulfur precursor injected for shell formation (first shell formation and second shell formation, etc.) may include two or more different compounds. In an embodiment, for forming a shell, a thiol compound and an additional sulfur precursor (e.g., a precursor including an elemental sulfur dispersed in an organic solvent) may be used.

In an embodiment, for the second quantum dots, a thiol compound and optionally an additional sulfur precursor may be used to form a shell. In an embodiment, for the first quantum dots, a thiol compound may not be used for the shell formation.

In an embodiment, the sulfur precursor for forming the shell (e.g., first shell layer) in the second quantum dots may include a thiol compound (e.g., a thiol compound having a C4 to C20 aliphatic hydrocarbon group such as alkanethiol, e.g., dodecanethiol, and the sulfur precursor for forming the second shell layer may be an organic solvent dispersion of sulfur powders (e.g., sulfur-octadecene (S-ODE), sulfur-trioctylphosphine (S-TOP), sulfur-tributylphosphine (S-TBP), sulfur-triphenylphosphine (S-TPP), sulfur-trioctylamine (S-TOA), or trimethylsilyl sulfur), mercapto propyl silane, trimethylsilyl sulfide, ammonium sulfide, sodium sulfide, or a combination thereof. The sulfur precursor may be injected one or more times (e.g., two or more times) as desired.

A shell forming temperature may be appropriately selected. In an embodiment, the shell forming temperature may be greater than or equal to about 270° C., greater than or equal to about 280° C., greater than or equal to about 290° C., greater than or equal to about 300° C., greater than or equal to about 310° C., or greater than or equal to about 315° C. In an embodiment, the shell forming temperature may be less than or equal to about 350° C., less than or equal to about 340° C., less than or equal to about 330° C., or less than or equal to about 325° C.

A shell forming reaction time is not particularly limited and may be appropriately selected. For example, the shell forming reaction may be performed, for example, for greater than or equal to about 20 minutes, greater than or equal to about 25 minutes, greater than or equal to about 30 minutes, greater than or equal to about 35 minutes, greater than or equal to about 40 minutes, greater than or equal to about 45 minutes, greater than or equal to about 50 minutes, greater than or equal to about 55 minutes, or greater than or equal to about 1 hour, but is not limited thereto. The shell forming reaction time may be less than or equal to about 3 hours.

Each precursor/compound may be added in a single step or (over) a plurality of times. When adding each precursor in a stepwise manner, the reaction may be performed for a predetermined time (e.g., greater than or equal to about 5 minutes, greater than or equal to about 10 minutes, or greater than or equal to about 15 minutes) in each step. The reaction may be performed under an inert gas atmosphere, air, or under vacuum, but is not limited thereto.

In the first shell formation, the selenium precursor may be added once or more (e.g., two or more times or three or more times, etc.). Depending on the composition of the shell, the second shell formation may proceed in the presence or absence of a selenium precursor.

When the shell forming process includes forming the first shell and forming the second shell, each reaction time may be appropriately selected depending on the desired shell composition, the type of precursor, and the reaction temperature. The shell formation (or first shell formation and second shell formation) may be (e.g., independently) performed for greater than or equal to about 40 minutes, greater than or equal to about 50 minutes, greater than or equal to about 60 minutes, greater than or equal to about 70 minutes, greater than or equal to about 80 minutes, or greater than or equal to about 90 minutes. A reaction time for shell formation (or first shell formation, second shell formation, or a combination thereof) may be (e.g., independently) less than or equal to about 4 hours, less than or equal to about 3 hours, less than or equal to about 2 hours, less than or equal to about 1 hour, or less than or equal to about 30 minutes.

When forming a shell or a multi-layered shell, an amount of the selenium precursor relative to indium in a reaction system (e.g., for forming the first shell) may be adjusted to form a shell or a first semiconductor nanocrystal shell having a predetermined thickness for a predetermined reaction time. The amount of the selenium precursor relative to indium in the reaction system (e.g., for forming the shell or the first shell), that is, an amount of selenium in moles per 1 mole of indium may be greater than or equal to about 3 moles, greater than or equal to about 4 moles, greater than or equal to about 5 moles, greater than or equal to about 6 moles, greater than or equal to about 7 moles, greater than or equal to about 8 moles, greater than or equal to about 9 moles, or greater than or equal to about 10 moles and less than or equal to about 20 moles, less than or equal to about 18 moles, or less than or equal to about 15 moles.

If present, an amount of the thiol precursor per 1 mole of indium in the reaction system at the time of shell formation (e.g., initial shell formation reaction or first shell formation) may be greater than or equal to about 0.5 moles, greater than or equal to about 1 mole, greater than or equal to about 1.5 moles, or greater than or equal to about 2 moles and less than or equal to about 15 moles, less than or equal to about 10 moles, less than or equal to about 9 moles, less than or equal to about 6 moles, less than or equal to about 4 moles, or less than or equal to about 3 moles.

In an embodiment, the reaction system for forming the second shell may not include a selenium precursor.

In an embodiment, an amount of the sulfur precursor (e.g., an organic solvent dispersion of elemental sulfur) relative to 1 mole of indium in the shell forming (or the second shell forming) reaction system may be such that the desired shell composition may be obtained (in consideration of reactivity and reaction temperature of the precursors). For example, the amount of the sulfur precursor relative to 1 mole of indium in the shell forming (e.g., second shell) reaction system may be greater than or equal to about 2 moles, greater than or equal to about 3 moles, greater than or equal to about 4 moles, greater than or equal to about 5 moles, greater than or equal to about 6 moles, greater than or equal to about 7 moles, greater than or equal to about 8 moles, greater than or equal to about 9 moles, or greater than or equal to about 10 moles and less than or equal to about 45 moles, less than or equal to about 40 moles, less than or equal to about 35 moles, less than or equal to about 30 moles, less than or equal to about 25 moles, less than or equal to about 20 moles, less than or equal to about 19 moles, less than or equal to about 18 moles, less than or equal to about 16 moles, less than or equal to about 15 moles, less than or equal to about 14 moles, less than or equal to about 13 moles, less than or equal to about 12 moles, less than or equal to about 11 moles, less than or equal to about 10 moles, less than or equal to about 9 moles, less than or equal to about 8 moles, less than or equal to about 7 moles, less than or equal to about 6 moles, or less than or equal to about 5 moles.

A non-solvent may be added into the obtained final reaction solution to precipitation of the quantum dots, the organic ligand-coordinated nanocrystals may then be separated (e.g., by filtration or centrifugation). The nonsolvent may be a polar solvent that is miscible with the solvent used in the reaction and the nanocrystals may be precipitated out (e.g., not-dispersible) therein. The nonsolvent may be selected depending on the solvent used in the reaction and may be for example, acetone, ethanol, butanol, isopropanol, ethanediol, water, tetrahydrofuran (THF), dimethylsulfoxide (DMSO), diethylether, formaldehyde, acetaldehyde, a solvent having a similar solubility parameter to the foregoing solvents, or a combination thereof. The separation may be performed through a centrifugation, precipitation, chromatography, or distillation. The separated nanocrystals may be added to a washing solvent and washed, if desired. The washing solvent has no particular limit and may have a similar solubility parameter to that of the organic ligand and may, for example, include hexane, heptane, octane, chloroform, toluene, benzene, and the like.

The quantum dots may be dispersed in a dispersion solvent. The quantum dots may form an organic solvent dispersion. The organic solvent dispersion may not include water, an organic solvent miscible with water, or a combination thereof. The dispersion solvent may be appropriately selected. The dispersion solvent may include the aforementioned organic solvent. The dispersion solvent may include a substituted or unsubstituted C1 to C40 aliphatic hydrocarbon group, a substituted or unsubstituted C6 to C40 aromatic hydrocarbon group, or a combination thereof.

In an embodiment, the color filter may be prepared by a composition that may include the first or second quantum dots; an (organic) solvent, a liquid vehicle, or a combination thereof; and optionally a monomer, a dispersing agent, or a combination thereof. The preparation may include carrying out a pattern forming process (e.g., in a photolithography or an ink-jet manner) with the composition.

In a composition of an embodiment, the dispersing agent may contribute to dispersing the quantum dots. In an embodiment, the dispersing agent may be a carboxylic acid group containing organic compound (e.g., a monomer or a polymer). The dispersing agent may be an insulating polymer.

The carboxylic acid group-containing organic compound may include a monomer combination or a copolymer thereof, the monomer combination including a first monomer including a carboxylic acid group and a carbon-carbon double bond, a second monomer having a carbon-carbon double bond, a hydrophobic moiety, or a combination thereof, and a second monomer not including a carboxylic acid group, and optionally a third monomer including a carbon-carbon double bond and a hydrophilic moiety and not including a carboxylic acid group;

a multiple aromatic ring-containing polymer having a backbone structure in which two aromatic rings are bound to a quaternary carbon atom that is a constituent atom of another cyclic moiety in the main chain and including a carboxylic acid group (—COOH) (hereinafter, cardo binder);

or a combination thereof.

The dispersing agent may include the first monomer, the second monomer, and optionally the third monomer.

In the composition, an amount of the dispersing agent may be greater than or equal to about 0.5 wt %, for example, greater than or equal to about 1 wt %, greater than or equal to about 5 wt %, greater than or equal to about 10 wt %, greater than or equal to about 15 wt %, or greater than or equal to about 20 wt %, based on a total weight or a solid content of the composition, but is not limited thereto. The amount of the dispersing agent may be less than or equal to about 35 wt %, for example less than or equal to about 33 wt %, or less than or equal to about 30 wt %, based on a total weight or a solid content of the composition. The amount of the dispersing agent may be about 0.5 wt % to about 55 wt %, based on a total weight of a solid content of the composition.

In an embodiment, the composition may include the polymerizable (e.g., photopolymerizable) monomer (hereinafter, may be referred to as "monomer") including the carbon-carbon double bond may include (e.g., photopolymerizable) (meth)acryl-based, i.e., (meth)acryl-containing, monomer. The monomer may be a precursor for an insulating polymer.

An amount of the monomer may be greater than or equal to about 0.5 wt %, for example, greater than or equal to about 1 wt %, or greater than or equal to about 2 wt %, based on a total weight or a total solid content of the composition. The amount of the monomer may be less than or equal to about 30 wt %, for example, less than or equal to about 28 wt %, less than or equal to about 25 wt %, less than or equal to about 23 wt %, less than or equal to about 20 wt %, less than or equal to about 18 wt %, less than or equal to about 17 wt %, less than or equal to about 16 wt %, or less than or equal to about 15 wt %, based on a total weight or a total solid content of the composition.

The (photo) initiator included in the composition is a compound that initiates a (photo)polymerization of the aforementioned monomers in the composition. The initiator is a compound accelerating a radical reaction (e.g., radical polymerization of monomer) by producing radical chemical species under a mild condition (e.g., by heat or light). The initiator may be a thermal initiator or a photoinitiator. The initiator is not particularly limited and may be appropriately selected.

In the composition, an amount of the initiator may be appropriately adjusted taking into consideration types and amounts of the polymerizable monomers. In an embodiment, the amount of the initiator may be greater than or equal to about 0.01 wt %, for example, greater than or equal to about 1 wt % and less than or equal to about 10 wt %, for example, less than or equal to about 9 wt %, less than or equal to about 8 wt %, less than or equal to about 7 wt %, less than or equal to about 6 wt %, or less than or equal to about 5 wt %, based on a total weight (or a total weight of the solid content) of the composition, but is not limited thereto.

The composition (or the polymer matrix) may further include a poly- or mono-thiol compound having a, e.g., at least one, thiol group (or a reaction product of the thiol compound and the monomer), a metal oxide particulate, or a combination thereof.

The metal oxide fine particle may include $TiO_2$, $SiO_2$, $BaTiO_3$, $Ba_2TiO_4$, ZnO, or a combination thereof. In the composition, an amount of the metal oxide fine particle may be greater than or equal to about 1 wt %, greater than or equal to about 5 wt %, or greater than or equal to about 10 wt % and less than or equal to about 50 wt %, less than or equal to about 40 wt %, less than or equal to about 30 wt %, less than or equal to about 25 wt %, less than or equal to about 20 wt %, less than or equal to about 15 wt %, less than or equal to about 10 wt %, or less than or equal to about 5 wt %, based on a total weight (or a solid content thereof) of the composition. The metal oxide fine particle may be non-emissive.

The metal oxide fine particle may have an appropriately selected diameter without a particular limit. The diameter of the metal oxide fine particle may be greater than or equal to about 100 nm, for example, greater than or equal to about 150 nm, or greater than or equal to about 200 nm and less than or equal to about 1,000 nm or less than or equal to about 800 nm.

The thiol compound may be a dithiol compound, a trithiol compound, a tetrathiol compound, or a combination thereof. For example, the thiol compound may be glycoldi-3-mercaptopropionate (e.g., ethylene glycol di-3-mercaptopropionate), glycoldimercaptoacetate (e.g., ethylene glycol dimercaptoacetate), trimethylolpropane-tris(3-mercaptopropionate), pentaerythritol tetrakis(3-mercaptopropionate), pentaerythritol tetrakis(2-mercaptoacetate), 1,6-hexanedithiol, 1,3-propanedithiol, 1,2-ethanedithiol, polyethylene glycol dithiol including 1 to 10 ethylene glycol repeating units, or a combination thereof.

An amount of the thiol compound may be less than or equal to about 50 wt %, less than or equal to about 40 wt %, less than or equal to about 30 wt %, less than or equal to about 20 wt %, less than or equal to about 10 wt %, less than or equal to about 9 wt %, less than or equal to about 8 wt %, less than or equal to about 7 wt %, less than or equal to about 6 wt %, or less than or equal to about 5 wt %, based on a total weight (or a total weight of the solid content) of the composition. The amount of the thiol compound may be greater than or equal to about 0.1 wt %, for example, greater than or equal to about 0.5 wt %, greater than or equal to about 1 wt %, greater than or equal to about 5 wt %, greater than or equal to about 10 wt %, or greater than or equal to about 15 wt %, based on a total weight (or a total weight of the solid content) of the composition.

The composition may further include an organic solvent (or a liquid vehicle, hereinafter referred to as a solvent). Types of the usable organic solvent are not particularly limited.

The composition may further include an organic solvent (or a liquid vehicle, hereinafter referred to as a solvent). Types of the usable organic solvent are not particularly limited. Examples of the solvent may include, but are not limited to: ethyl 3-ethoxy propionate; an ethylene glycol series such as ethylene glycol, diethylene glycol, or polyethylene glycol; a glycol ether series such as ethylene glycol monomethyl ether, ethylene glycol monoethyl ether, diethylene glycol monomethyl ether, ethylene glycol diethyl ether, or diethylene glycol dimethyl ether; a glycol ether acetate series such as ethylene glycol monomethyl ether acetate, ethylene glycol monoethyl ether acetate, diethylene glycol monoethyl ether acetate, or diethylene glycol monobutyl ether acetate; a propylene glycol series such as propylene glycol; a propylene glycol ether series such as propylene glycol monomethyl ether, propylene glycol monoethyl ether, propylene glycol monopropyl ether, propylene glycol monobutyl ether, propylene glycol dimethyl ether, dipropylene glycol dimethyl ether, propylene glycol diethyl ether, or dipropylene glycol diethyl ether; a propylene glycol ether acetate series such as propylene glycol monomethyl ether acetate or dipropylene glycol monoethyl ether acetate; an amide series such as N-methylpyrrolidone, dimethyl formamide, or dimethyl acetamide; a ketone series such as methyl ethyl ketone (MEK), methyl isobutyl ketone (MIBK), or cyclohexanone; a petroleum product such as toluene, xylene, or solvent naphtha; an ester series such as ethyl acetate, propyl acetate, butyl acetate, cyclohexyl acetate, or ethyl lactate; an ether such as diethyl ether, dipropyl ether, or dibutyl ether; chloroform, a C1 to C40 aliphatic hydrocarbon group (e.g., alkane, alkene, or alkyne), a halogen (e.g., chloro) substituted C1 to C40 aliphatic hydrocarbon group (e.g., dichloroethane, trichloromethane, or the like), a C6 to C40 aromatic hydrocarbon group (e.g., toluene, xylene, or the like), a halogen (e.g., chloro) substituted C6 to C40 aromatic hydrocarbon group, or a combination thereof.

Types and amounts of the solvent may be appropriately selected by taking into consideration the aforementioned main components (i.e., the quantum dot, the dispersing agent, the photopolymerizable monomer, the photoinitiator, and if used, the thiol compound), and types and amounts of additives which will be described herein. The composition may include a solvent in a residual amount except for a desired amount of the solid content (non-volatile components).

The composition (e.g., an ink jet composition) may have a viscosity at 25° C. of greater than or equal to about 4 centiPoise (cPs), greater than or equal to about 5 cPs, greater than or equal to about 5.5 cPs, greater than or equal to about 6.0 cPs, or greater than or equal to about 7.0 cPs. The composition (e.g., an ink jet composition) may have a viscosity at 25° C. of less than or equal to about 12 cPs, less than or equal to about 10 cPs, or less than or equal to about 9 cPs.

In an embodiment, the composition may be applied in an ink jet process, and the ink composition may have a surface tension (for example, at 23° C.) of greater than or equal to about 21 milliNewtons per meter (mN/m), greater than or equal to about 22 mN/m, greater than or equal to about 23 mN/m, greater than or equal to about 24 mN/m, greater than or equal to about 25 mN/m, greater than or equal to about 26 mN/m, greater than or equal to about 27 mN/m, greater than or equal to about 28 mN/m, greater than or equal to about 29 mN/m, greater than or equal to about 30 mN/m, or greater than or equal to about 31 mN/m and less than or equal to about 40 mN/m, less than or equal to about 39 mN/m, less than or equal to about 38 mN/m, less than or equal to about 37 mN/m, less than or equal to about 36 mN/m, less than or equal to about 35 mN/m, less than or equal to about 34 mN/m, less than or equal to about 33 mN/m, or less than or equal to about 32 mN/m. A surface tension of the ink composition may be less than or equal to about 31 mN/m, less than or equal to about 30 mN/m, less than or equal to about 29 mN/m, or less than or equal to about 28 m N/m.

In an embodiment, the composition may further include an additive such as a light diffusing agent, a leveling agent, or a coupling, that can be used for a photoresist composition or an ink composition.

Figure 7A:
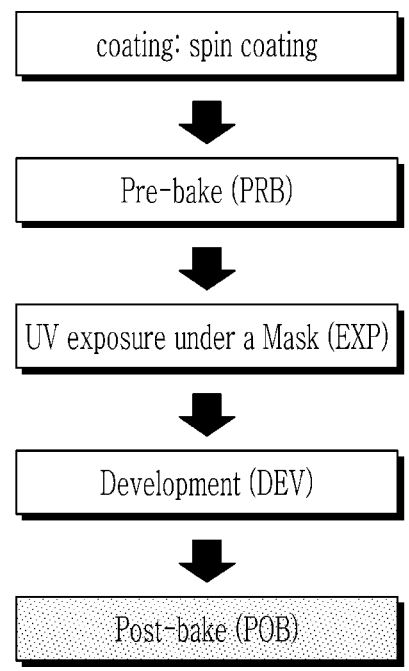
FIG. 7A schematically represents a process of producing a quantum dot composite pattern using a composition according to an embodiment.
Figure 7A:

In an embodiment, a first pixel includes a (patterned) quantum dot composite or film including the same, which may be produced by a method using the photoresist composition. Non-limiting methods of forming the pattern are illustrated, referring to FIG. 7A. The method may include:

forming a film of the composition on a substrate (S1);
optionally prebaking the film (S2);
exposing a selected region of the film to light (e.g., a wavelength of less than or equal to about 400 nm) (S3); and
developing the exposed film with an alkali developing solution to obtain a pattern including the quantum dot-polymer composite (S4).

The composition may be coated to have a predetermined thickness on a substrate in an appropriate method of spin coating, slit coating, and the like (S1). The formed film may be, optionally, pre-baked (PRB) (S2). The pre-baking may be performed by selecting appropriate conditions of temperature, time, atmosphere, and the like.

The formed (or optionally pre-baked) film may be exposed to light having a predetermined wavelength under a mask (e.g., a photomask for a photolithography process) having a predetermined pattern (S3). A wavelength and intensity of the light may be selected by taking into consideration the initiator (e.g., photoinitiator), an amount of the initiator (e.g., photoinitiator), the quantum dots, amounts of the quantum dots, and the like. In FIG. 2A, the BM denotes a black matrix and RGB represents a color section.

The exposed film may be treated with an alkali developing solution (e.g., dipping or spraying) to dissolve an unexposed region and obtain a desired pattern (S4). The obtained pattern may be, optionally, post-baked (FOB) to improve crack resistance and solvent resistance of the pattern, for example, at about 150° C. to about 230° C. for a predetermined time (e.g., greater than or equal to about 10 minutes or greater than or equal to about 20 minutes) (S5).

In an embodiment in which the quantum dot-polymer composite pattern has a plurality of repeating sections, a quantum dot-polymer composite having a desired pattern may be obtained by preparing a plurality of compositions including a quantum dot having desired photoluminescence properties (a photoluminescence peak wavelength and the like) to form each repeating section (e.g., a red light emitting quantum dot, a green light emitting quantum dot, or optionally, a blue light emitting quantum dot) and an appropriate number of times (e.g., two or more times or three or more times) repeating a formation of the pattern about each composition (S6). For example, the quantum dot-polymer composite may have, e.g., be provided in, a pattern including at least two repeating color sections (e.g., red/green/blue (RGB) sections). The quantum dot-polymer composite pattern may be used as a photoluminescence-type color filter in a display device.

Figure 7B:
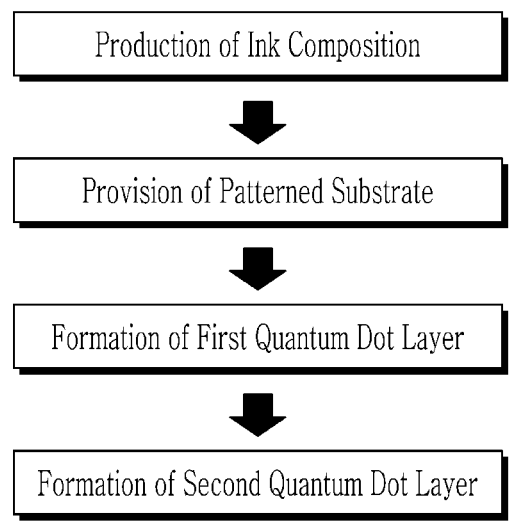
FIG. 7B schematically represents a process of producing a quantum dot composite pattern using an ink composition.

A quantum dot composite pattern may be formed by using an ink composition configured to form a pattern via an ink jet manner. Referring to FIG. 7B, the method includes preparing an ink composition; obtaining a substrate including a pattern of, for example, an electrode and optionally a pixel area formed by a bank; depositing an ink composition on the substrate (or the pixel area) to form a first quantum dot layer (or a first repeating section); and depositing an ink composition on the substrate (or the pixel area) to form a second quantum dot layer (or a second repeating section). Formation of the first quantum dot layer and the second quantum dot layer may be carried out simultaneously or sequentially.

Deposition of the ink composition may be carried out using an appropriate droplet discharging system such as an ink jet printer or a nozzle printing system (e.g., having an ink reservoir and a, e.g., at least one, printer head). The deposited ink composition may be heated to remove a solvent and optionally to carry out a polymerization, and thus, provide a (first or second) quantum dot layer. The method may provide a highly precise quantum dot-polymer composite film or pattern in a relatively simple way in a relatively short period of time.

The aforementioned color filter including the quantum dot composite (pattern) may be included in an electronic device. Such an electronic device may include a display device, a light emitting diode (LED), an organic light emitting diode (OLED), a quantum dot LED, a sensor, a solar cell, an imaging sensor, a photodetector, or a liquid crystal display device, but is not limited thereto. The aforementioned quantum dots may be included in an electronic apparatus. Such an electronic apparatus may include a portable terminal device, a monitor, a notebook personal computer (PC), a television, an electronic display, a camera, an automobile, and the like, but are not limited thereto. The electronic apparatus may be a portable terminal device including a display device (or light emitting device) including quantum dots, a monitor, a notebook PC, or a television. The electronic apparatus may be a camera or a portable terminal device including an image sensor including quantum dots. The electronic apparatus may be a camera or a vehicle including a photodetector including quantum dots.

The color filter may be a layered structure that further includes a (e.g., transparent) substrate, and the quantum dot composite (pattern) may be disposed on a surface of the substrate. In an embodiment, a first optical element, an incident (or excitation) light cutting element, or an absorption-type color filter, or a combination thereof may be disposed between the substrate and the quantum dot composite. In an embodiment, the color filter may include a red pixel, green pixel, and blue pixel and in each of the red pixel and the green pixel, a plurality of quantum dots may be included and the blue pixel may be configured to pass at least a portion of incident light (e.g., to pass blue light). On the other side of the substrate may be disposed an additional optical film.

The device (e.g., a display device or a light emitting device) may further include a light source. In the device, the light source may be an element emitting incident light. The light source may be configured to provide incident light to each pixel (e.g., a quantum dot composite) of the color filter. The incident or excitation light may include blue light and optionally green light. The light source may include an LED. The light source may include an organic LED (e.g., OLED). In an embodiment, on a front side (i.e., light emitting face) of the red pixel and the green pixel is disposed a first optical element cutting (e.g., absorbing or reflecting) blue light and optionally green light. The light source may include a blue light emitting OLED (organic light emitting diode) and a green light emitting OLED, and on the third section emitting or transmitting blue light is disposed an optical element that filters or removes green light.

The blue light from the light source may have a wavelength of greater than or equal to about 440 nm, greater than or equal to about 450 nm, greater than or equal to about 460 nm, or greater than or equal to about 465 nm and less than or equal to about 500 nm, less than or equal to about 480 nm, less than or equal to about 470 nm, or less than or equal to about 460 nm. The green light from the light source may have a wavelength of greater than or equal to about 480 nm, greater than or equal to about 500 nm, greater than or equal to about 510 nm, greater than or equal to about 520 nm, or greater than or equal to about 530 nm. The green light from the light source may have a wavelength of less than or equal to about 580 nm, less than or equal to about 560 nm, less than or equal to about 540 nm, or less than or equal to about 535 nm.

In an embodiment, the light source may include a plurality of light emitting units respectively corresponding to the first section and the second section, and the light emitting units may include a first electrode and a second electrode each having a surface opposite the other and an electroluminescence layer disposed between the first electrode and the second electrode. The electroluminescence layer may include an organic light emitting material. For example, each light emitting unit of the light source may include an electroluminescent device (e.g., an organic light emitting diode (OLED)) configured to emit light of a predetermined wavelength (e.g., blue light, green light, or a combination thereof). Structures and materials of the electroluminescent device and the organic light emitting diode (OLED) are not particularly limited. The light source includes an organic light emitting diode (OLED) emitting blue light (and optionally, green light).

Figure 8A:
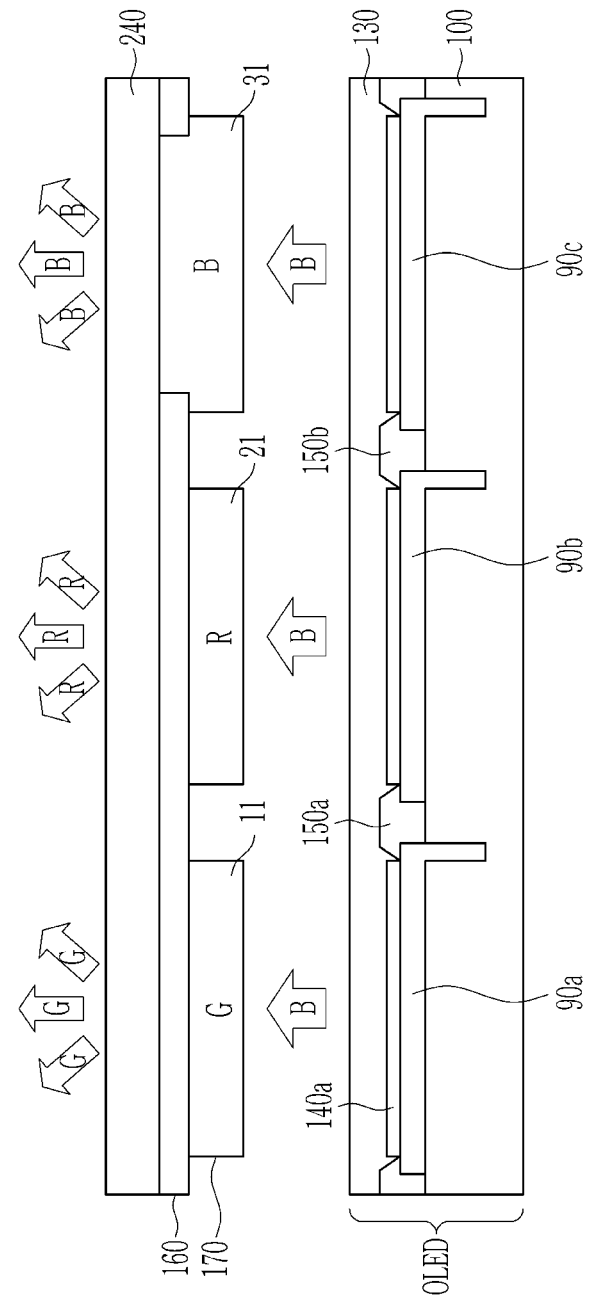
FIG. 8A is a schematic cross-sectional view of a display device according to an embodiment.
Figure 8B:
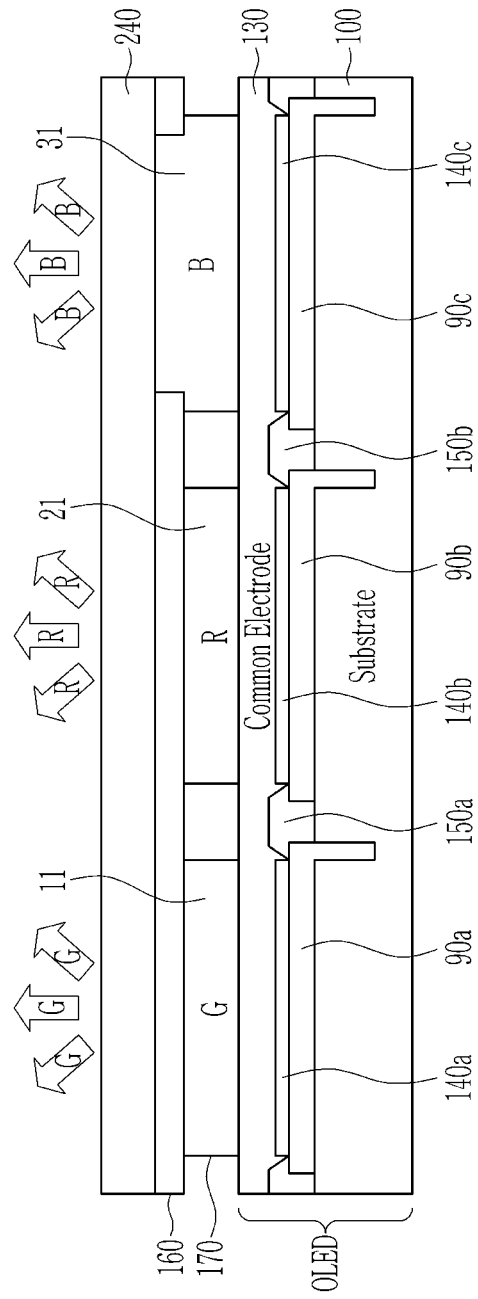
FIG. 8B is a schematic cross-sectional view of a display device according to an embodiment.
Figure 9:
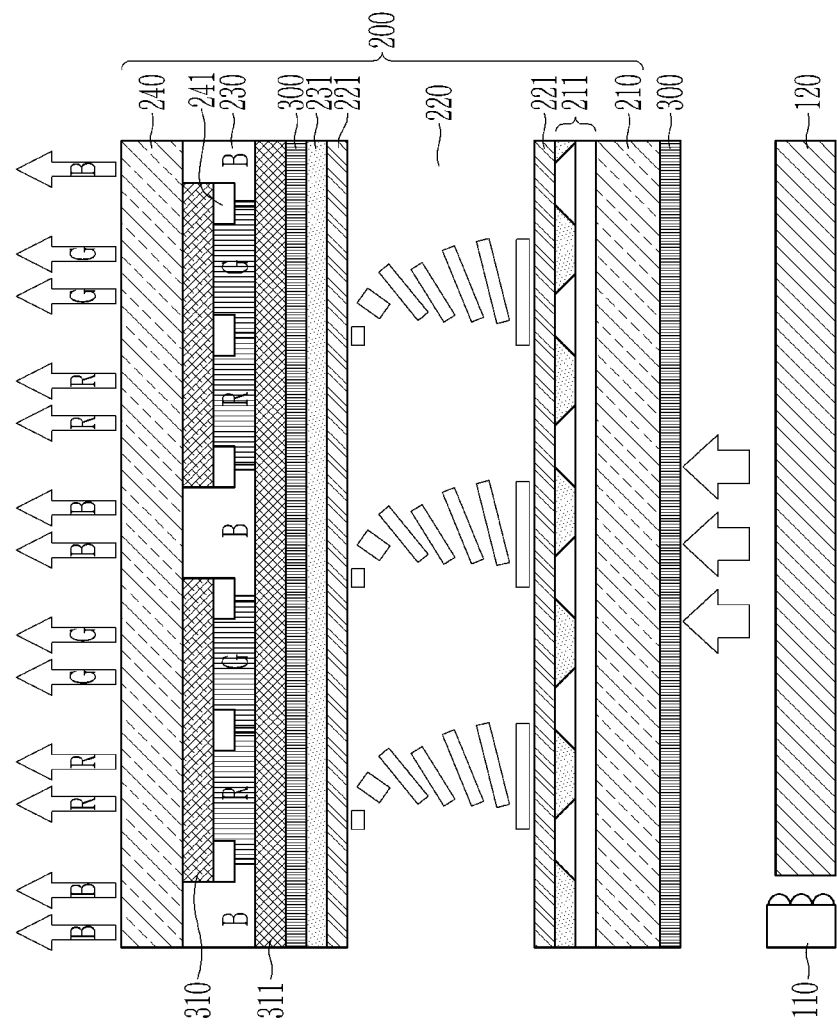
FIG. 9 is a schematic cross-sectional view of a display device according to an embodiment.

FIGS. 8A and 8B are schematic cross-sectional views of display devices according to embodiments. Referring to FIGS. 8A and 8B, a light source includes an organic light emitting diode (OLED) emitting blue light. The organic light emitting diode OLED may include (at least two, for example, three or more) pixel electrodes 90a, 90b, 90c formed on a substrate 100, a pixel defining layer 150a, 150b formed between the adjacent pixel electrodes 90a, 90b, 90c, an organic light emitting layer 140a, 140b, 140c formed on the pixel electrodes 90a, 90b, 90c, and a common electrode (layer) 130 formed on the organic light emitting layer 140a, 140b, 140c. A thin film transistor and a substrate may be disposed under the organic light emitting diode (OLED).

A stacked structure including a quantum dot polymer composite pattern 170 (e.g., a section including red quantum dot and a section including green quantum dot) and a substrate may be disposed on the light source. The excitation light (e.g., blue light) emitted from the light source and incident upon the patterned sections may be converted into red and green light, respectively. The blue light emitted from the light source may pass through the third section of the patterned quantum dot polymer composite.

Over the second section 21 emitting red light, the first section 11 emitting green light, or a combination thereof, an optical element 160 may be disposed. The optical element may be an excitation light cut layer or a first optical filter layer, which cuts (e.g., reflects or absorbs) the excitation light (e.g., blue light, green light, or a combination thereof). In an embodiment, the excitation light may include blue light and green light, and a green light cut filter may be disposed over the third section (e.g., blue pixel). Details of the excitation light cut layer are the same as set forth for the first optical filter herein.

The device may be obtained by separately producing the aforementioned stacked structure and (e.g., blue light emitting) LED or OLED and then assembling the same. Alternatively, the display device may be obtained by forming a quantum dot polymer composite pattern directly on the LED or OLED.

The substrate may be a substrate including an insulating material. The substrate may include glass; various polymers such as polyester (e.g., polyethylene terephthalate (PET), or polyethylene naphthalate (PEN)), polycarbonate, and poly (meth)acrylate; polysiloxane (e.g., polydimethylsiloxane (PDMS)); an inorganic material such as $Al_2O_3$ or ZnO; or a combination thereof, but is not limited thereto. A thickness of the substrate may be appropriately selected taking into consideration a substrate material but is not particularly limited. The substrate may have flexibility. The substrate may have a transmittance of greater than or equal to about 50%, greater than or equal to about 60%, greater than or equal to about 70%, greater than or equal to about 80%, or greater than or equal to about 90% for light emitted from the quantum dots.

A wire layer including a thin film transistor or the like is formed on the substrate. The wire layer may further include a gate line, a sustain voltage line, a gate insulating layer, a data line, a gate electrode, a source electrode, a drain electrode, a semiconductor layer, a protective layer, and the like. The detail structure of the wire layer may be verified according to an embodiment. The gate line and the sustain voltage line are electrically separated from each other, and the data line is insulated and crossing the gate line and the sustain voltage line. The gate electrode, the source electrode, and the drain electrode form a control terminal, an input terminal, and an output terminal of the thin film transistor, respectively. The drain electrode is electrically connected to the pixel electrode that will be described herein.

The pixel electrode may function as an anode of the display device. The pixel electrode may be formed of a transparent conductive material such as indium tin oxide (ITO) or indium zinc oxide (IZO). The pixel electrode may be formed of a material having a light-blocking properties such as gold (Au), platinum (Pt), nickel (Ni), tungsten (W), chromium (Cr), molybdenum (Mo), iron (Fe), cobalt (Co), copper (Cu), palladium (Pd), or titanium (Ti). The pixel electrode may have a two-layered structure in which the aforementioned transparent conductive material and the aforementioned material having light-blocking properties are stacked sequentially.

Between two adjacent pixel electrodes, a pixel define layer (PDL) may be overlapped with a terminal end of the pixel electrode to divide the pixel electrode into a pixel unit. The pixel define layer may be an insulation layer which may electrically block the at least two pixel electrodes.

The pixel define layer may cover a portion of the upper surface of the pixel electrode, and the remaining region of the pixel electrode not covered by the pixel define layer may provide an opening. An organic light emitting layer that will be described herein may be formed on the region defined by the opening.

The organic light emitting layer defines each pixel area by the aforementioned pixel electrode and pixel define layer. In other words, one pixel area may be defined as an area formed with one organic emission unit layer which is contacted with one pixel electrode divided by the pixel define layer. For example, in the display device according to an embodiment, the organic light emitting layer may be defined as a first pixel area, a second pixel area and a third pixel area, and each pixel area is spaced apart from each other leaving a predetermined interval by the pixel define layer.

In an embodiment, the organic light emitting layer may emit a third light belonging to a visible light region or belonging to an ultraviolet (UV) region. In other words, each of the first to the third pixel areas of the organic light emitting layer may emit a third light. In an embodiment, the third light may be a light having the highest energy in the visible light region, for example, may be blue light. When all pixel areas of the organic light emitting layer are configured to emit the same light, each pixel area of the organic light emitting layer may be all formed of the same or similar materials or may show, e.g., exhibit, the same or similar properties. Such a design of the light emitting layer may significantly simplify the processes in forming the organic light emitting layer, and therefore, a display device may be applied to, e.g., made by, large scale/large area processing. However, the organic light emitting layer according to an embodiment is not necessarily limited thereto, but the organic light emitting layer may be configured to emit at least two different lights.

The organic light emitting layer includes an organic emission unit layer in each pixel area, and each organic emission unit layer may further include an auxiliary layer (e.g., hole injection layer (HIL), hole transport layer (HTL), electron transport layer (ETL), etc.) besides the light emitting layer.

The common electrode may function as a cathode of the display device. The common electrode may be formed of a transparent conductive material such as indium tin oxide (ITO) or indium zinc oxide (IZO). The common electrode may be formed on the organic light emitting layer and may be integrated therewith.

A planarization layer or a passivation layer (not shown) may be formed on the common electrode. The planarization layer may include a (e.g., transparent) insulating material for ensuring electrical insulation with the common electrode.

In an embodiment, the display device may further include a lower substrate, a polarizer disposed under the lower substrate, and a liquid crystal layer disposed between the stacked structure and the lower substrate, and in the stacked structure, the light emitting layer may be disposed over a face of the liquid crystal layer. The display device may further include a polarizer between the liquid crystal layer and the light emitting layer. The light source may further include LED and if desired, a light guide panel.

Non-limiting examples of the display device (e.g., a liquid crystal display device) according to an embodiment are illustrated with a reference to a drawing. FIG. 5 is a schematic cross-sectional view showing a liquid crystal display according to an embodiment. Referring to FIG. 5, the display device of an embodiment includes a liquid crystal panel 200, a polarizer 300 disposed under the liquid crystal panel 200, and a backlight unit (BLU) disposed under the polarizer 300.

The liquid crystal panel 200 includes a lower substrate 210, a stacked structure, and a liquid crystal layer 220 disposed between the stacked structure and the lower substrate. The stacked structure includes a transparent substrate (or referred to as an upper substrate) 240 and a photoluminescent layer 230 including a pattern of a quantum dot polymer composite as described.

The lower substrate 210, also referred to as an array substrate, may be a transparent insulation material substrate. A wire plate 211 is provided on an upper surface of the lower substrate 210. The wire plate 211 may include a plurality of gate wires (not shown) and data wires (not shown) that define a pixel area, a thin film transistor disposed adjacent to a crossing region of gate wires and data wires, and a pixel electrode for each pixel area, but is not limited thereto. Details of such a wire plate are not particularly limited.

The liquid crystal layer 220 may be disposed on the wire plate 211. The liquid crystal panel 200 may include an alignment layer 221 on the layer 220 to initially align the liquid crystal material. Details (e.g., a liquid crystal material, an alignment layer material, a method of forming liquid crystal layer, a thickness of liquid crystal layer, or the like) of the liquid crystal material and the alignment layer are not particularly limited.

A lower polarizer 300 is provided under the lower substrate. Materials and structures of the polarizer 300 are not particularly limited. A backlight unit (e.g., emitting blue light) may be disposed under the polarizer 300. An upper optical element or an upper polarizer 300 may be provided between the liquid crystal layer 220 and the transparent substrate 240, but is not limited thereto. For example, the upper polarizer 300 may be disposed between the liquid crystal layer 220 and the light emitting layer 230. The polarizer may be any suitable polarizer that may be used in a liquid crystal display device. The polarizer may be TAC (triacetyl cellulose) having a thickness of less than or equal to about 200 μm, but is not limited thereto. In an embodiment, the upper optical element may be a coating that controls a refractive index without a polarization function.

The backlight unit includes a light source 110. The light source may emit blue light or white light. The light source may include a blue LED, a white LED, a white OLED, or a combination thereof, but is not limited thereto.

The backlight unit may further include a light guide panel 120. In an embodiment, the backlight unit may be an edge-type lighting. For example, the backlight unit may include a reflector (not shown), a light guide panel (not shown) provided on the reflector and providing a planar light source with the liquid crystal panel 200, a, e.g., at least one, optical sheet (not shown) on the light guide panel, for example, a diffusion plate, a prism sheet, and the like, but is not limited thereto, or a combination thereof. The backlight unit may not include a light guide panel. In an embodiment, the backlight unit may be a direct lighting. For example, the backlight unit may have a reflector (not shown), and may have a plurality of fluorescent lamps disposed on the reflector at regular intervals, or may have an LED operating substrate on which a plurality of light emitting diodes may be disposed, a diffusion plate thereon, and optionally a, e.g., at least one, optical sheet. Details (e.g., each component of a light emitting diode, a fluorescent lamp, a light guide panel, various optical sheets, and a reflector) of such a backlight unit are not particularly limited.

A black matrix 241 is provided under the transparent substrate 240 and has openings and hides a gate line, a data line, and a thin film transistor of the wire plate on the lower substrate. For example, the black matrix 241 may have a lattice shape. The photoluminescent layer 230 is provided in the openings of the black matrix 241 and has a quantum dot-polymer composite pattern including a first section (R) configured to emit a first light (e.g., red light), a second section (G) configured to emit a second light (e.g., green light), and a third section (B) configured to emit/transmit, for example blue light. If desired, the photoluminescent layer may further include a, e.g., at least one, fourth section. The fourth section may include a quantum dot that emits different color from light emitted from the first to third sections (e.g., cyan, magenta, or yellow light).

In the light emitting layer 230, sections forming a pattern may be repeated corresponding to pixel areas formed on the lower substrate. A transparent common electrode 231 may be provided on the photoluminescent color filter layer.

The third section (B) configured to emit/transmit blue light may be a transparent color filter that does not change a light emitting spectrum of the light source. Blue light emitted from the backlight unit may enter in a polarized state and may be emitted through the polarizer and the liquid crystal layer as it is. If desired, the third section may include a quantum dot emitting blue light.

If desired, the display device may further have a blue light blocking layer (blue cut filter) or a first optical filter layer. The blue light blocking layer may be disposed between lower surfaces of the first section (R) and the second section (G) and the upper substrate 300 or on the upper surface of the upper substrate. The blue light blocking layer may be a sheet having an opening in a region corresponding to a pixel area (a third section) displaying blue and thus may be formed in a region corresponding to the first and second sections. As shown in FIGS. 2A, 2B, and 3, the first optical filter layer may be integrally formed as one body structure at the remaining positions except positions overlapped with the third section, but is not limited thereto. At least two first optical filter layers may be spaced apart and be disposed on each of the positions overlapped with the first and the second sections. In an embodiment, the light source may include a green light emitting element and a green light cutting element may be disposed on the third section.

In an embodiment, the first optical filter layer may block light having a portion of a wavelength region in the visible light region and transmit light having other wavelength regions. In an embodiment, the first optical filter layer may block blue light (or green light) and transmit light except blue light (or green light). In an embodiment, the first optical filter layer may transmit green light, red light, and/or or yellow light that is mixed light thereof.

In an embodiment, the first optical filter layer may substantially block the incident light and may transmit light in a desired wavelength region. In an embodiment, the first optical filter layer may have light transmittance of greater than or equal to about 70%, greater than or equal to about 80%, greater than or equal to about 90%, or about 100%, with respect to the light of the desired wavelength region.

In an embodiment, a first optical filter layer selectively transmitting red light may be disposed on the portion overlapped with the section emitting red light and the first optical filter layer selectively transmitting green light may be disposed on the portion overlapped with the section emitting green light, respectively. In an embodiment, the first optical filter layer may include a first region, a second region, or a combination thereof, wherein the first region blocks (e.g., absorbs) blue light and red light and transmits light having a wavelength of a predetermined range (e.g., greater than or equal to about 500 nm, greater than or equal to about 510 nm, or greater than or equal to about 515 nm and less than or equal to about 550 nm, less than or equal to about 545 nm, less than or equal to about 540 nm, less than or equal to about 535 nm, less than or equal to about 530 nm, less than or equal to about 525 nm, or less than or equal to about 520 nm) and the second region blocks (e.g., absorbs) blue light and green light and transmits light having a wavelength of a predetermined range (e.g., greater than or equal to about 600 nm, greater than or equal to about 610 nm, or greater than or equal to about 615 nm and less than or equal to about 650 nm, less than or equal to about 645 nm, less than or equal to about 640 nm, less than or equal to about 635 nm, less than or equal to about 630 nm, less than or equal to about 625 nm, or less than or equal to about 620 nm). In an embodiment, the light source may emit blue light and green light at the same time, and the first optical filter layer may include a third region which transmits selectively the blue light and blocks the green light.

The first region may be disposed at a place overlapped with the section emitting green light and the second region may be disposed at a place overlapped with the section emitting red light. The third region may be disposed at a place passing or emitting the blue light.

The first region, the second region, and if present the third region may be optically isolated. The first optical filter (layer) may contribute to improving color purity of a display device.

The display device may further include a second optical filter layer (e.g., a red/green or yellow light recycle layer) 311 disposed between the photoluminescent layer and the liquid crystal layer (e.g., the photoluminescent layer and the upper polarizing plate, e.g., polarizer), transmitting at least a portion of a third light (excitation light), and reflecting at least a portion of the first light, at least a portion of the second light, or at least a portion of each of the first light and second light. The first light may be red light, the second light may be green light, and the third light may be blue light. In an embodiment, the second optical filter layer may transmit only the third light (B) in a blue light wavelength region having a wavelength region of less than or equal to about 500 nm and light in a wavelength region of greater than about 500 nm, which is green light (G), yellow light, red light (R), or the like, may be not passed through the second optical filter layer and may be reflected. The reflected green light and red light may pass through the first and second sections and to be emitted to the outside of the display device.

The second optical filter layer or the first optical filter layer may be formed as an integrated layer having a relatively planar surface.

The first optical filter layer may include a polymer thin film including a dye absorbing light in a wavelength which is to be blocked, a pigment absorbing light in a wavelength which is to be blocked, or a combination thereof. The second optical filter layer and the first optical filter layer may include a single layer having a low refractive index, and may be, for example, a transparent thin film having a refractive index of less than or equal to about 1.4, less than or equal to about 1.3, or less than or equal to about 1.2. The second optical filter layer or the first optical filter layer having a low refractive index may be, for example, a porous silicon oxide, a porous organic material, a porous organic/inorganic composite, or a combination thereof.

The first optical filter layer or the second optical filter layer may include a plurality of layers having different refractive indexes. The first optical filter layer or the second optical filter layer may be formed by laminating two layers having different refractive indexes. For example, the first/second optical filter layer may be formed by alternately laminating a material having a high refractive index and a material having a low refractive index.

Hereinafter, the embodiments are illustrated in more detail with reference to examples. However, they are exemplary embodiments of the present invention, and the present invention is not limited thereto.

EXAMPLES

Analysis Methods
1. Ultraviolet-visible (UV-Vis) Spectroscopy Analysis

UV-Vis spectroscopy is performed, and a UV-Visible absorption spectrum and its first derivative are obtained, using an Agilent Cary 5000 spectrophotometer.

2. Photoluminescence Analysis

A photoluminescence (PL) spectrum of a produced core shell quantum dot at an excitation wavelength of 450 nanometers (nm) or 458 nm is obtained using a Hitachi F-7000 spectrophotometer.

During the spectroscopy analysis, a concentration of a dispersion is controlled so that an optical density at 458 nm of UV-Vis absorption thereof is from about 0.09 to 0.11. From the PL spectrum, a (maximum) luminescent peak wavelength, quantum yield, a full width at half maximum (fwhm) may be evaluated.

3. Absolute Quantum Yield

An absolute quantum yield is measured by using Otsuka Electronics QE-2100 at an incident light of about 450 nm.

4. Blue Light Absorption, Light Conversion Efficiency (CE), and Light Conversion of Composite The light amount (B) of blue excitation light is determined using an integral hemisphere of an absolute quantum efficiency measurement equipment. A Quantum Dot (QD) composite is positioned within the integrating sphere and then irradiated with blue excitation light (B) to measure a light dose (A) of green light emitted from the QD composite and a light dose (B') of blue light from (i.e., passed through) the QD composite.

The measured results are used to calculate a blue light absorption, a blue light conversion, and a light conversion efficiency in accordance with the following equations.

blue light absorption=$(B-B')/B \times 100(\%)$ light conversion=$A/B \times 100(\%)$ light conversion efficiency $(CE)=(A/(B-B')) \times 100(\%)$

Reference Example

The second quantum dots each having a core-shell structure and a first absorption peak at 480 nm and a luminescent peak at 500 nm are prepared and the first quantum dots each having a core-shell structure different from the second quantum dot and a first absorption peak at 500 nm and a luminescent peak at 520 nm.

Core Synthesis

Zinc acetate and oleic acid are dissolved in 1-octadecene in a 250 milliliter (mL) reaction flask and then heated at 120° C. under vacuum and cooled to room temperature to obtain a zinc oleate solution.

To the reaction flask, indium acetate and lauric acid are added, and the mixture is heated at 120° C. under vacuum. After one hour, an atmosphere of the reaction flask is changed into nitrogen.

While a temperature in the reaction flask is increased to 250° C., a mixed solution of tris(trimethylsilyl)phosphine ((TMS)$_3$P) and trioctylphosphine is rapidly injected into the reaction flask, and the reaction is monitored by taking a small reaction sample from the reaction flask, and then an UV-Vis absorption spectrum is taken of the sample. The reaction is allowed to continue until the absorption spectrum reaches a target wavelength. When the reaction is complete, the reaction solution is rapidly cooled down to room temperature. Acetone is added to facilitate formation of a precipitate, the precipitate is separated with a centrifuge, and the isolated precipitate is dispersed in toluene to prepare a toluene dispersion of the core.

A mole ratio among indium, zinc, and phosphorous used in the preparation is 6:7:4.5. As confirmed by the absorption spectrum analysis, a size of the core is about 2.1 nm.

Second Quantum Dot Population (1) Selenium is dispersed in trioctylphosphine to prepare a Se/trioctylphosphine (TOP) stock solution, and sulfur is dispersed in trioctylphosphine to prepare a S/TOP stock solution.

Zinc acetate and oleic acid are dissolved in trioctylamine in a 2 liter (L) reaction flask, and the solution is vacuum-treated at 120° C. for 10 minutes. The reaction flask is filled with nitrogen (N$_2$), the solution is heated to 280° C. and then cooled to 100° C. The toluene dispersion of the core prepared according to Reference Example 1 is added to the reaction flask, and the Se/TOP stock solution and dodecanethiol are injected at intervals several times into the reaction flask as the flask temperature is maintained at a reaction temperature of about 280° C. The resulting reaction solution includes particles including the InZnP core and a ZnSeS shell disposed on the core. A total reaction time is about 30 minutes. In the preparation, a total amount of the Se and a total amount of the dodecanethiol (DDT) as used are 7 moles and 2 moles, per one mole of indium.

Then, the S/TOP stock solution is injected into the reaction mixture to conduct a reaction at the reaction temperature to obtain a reaction solution that includes a core shell quantum dot having a ZnS-second shell on the ZnSeS first shell. A total reaction time is 60 minutes, and a total amount of the sulfur as used is about 6 moles per 1 mole of indium.

The reaction mixture is cooled to room temperature and an excess amount of ethanol is added to facilitate formation of the core shell quantum dot, which are then separated with a centrifuge. After the centrifugation, the supernatant is discarded and the precipitate is dried and then dispersed in toluene to obtain a toluene solution of the quantum dots (hereinafter, a QD solution).

As determined by a transmission electron microscope, an average particle size of the second quantum dots is about 4.5 nm and the sizes of second quantum dot population shows substantially a normal distribution.

First Quantum Dot Population

The first quantum dots are prepared according to the same method as Example 1 except that based on 1 mole of indium, an amount of selenium (Se/TOP stock solution) is 21 moles, and dodecanethiol is not used during the first shell to form a ZnSe shell and an amount of sulfur per one mole of indium is about 3 moles.

As determined by a transmission electron microscope, an average particle size of the second quantum dots is about 6.2 nm and the sizes of second quantum dot population shows substantially a normal distribution.

Example 1: $2^{nd}$ Layer/$1^{st}$ Layer Structure

The first (or second) quantum dots are washed two times with acetone and ethanol, respectively and dried under vacuum for 12 hours.

The first (or second) quantum dots and TiO$_2$ fine particles are mixed with a monomer, a polymer, and an initiator to form a first (or second) quantum dot composition wherein the amount of the first (or second) quantum dots is 42 wt % and the amount of the fine particles is 3 wt %, respectively, based on a total solid content of the composition.

The second quantum dot composition is first spin-coated on a glass substrate of a thickness 100 millimeters (mm) to obtain films. The films are pre-baked (PRB) at 100° C. for 2 minutes. The pre-baked films are exposed to irradiation of light under a photomask, is developed, and then is heat-treated (FOB) at 180° C. for 30 minutes to form a 5 μm thick, $2^{nd}$ quantum dot composite patterned film (hereinafter, $2^{nd}$ layer).

The first quantum dot composition is first spin-coated on a second layer to obtain films. The films are pre-baked (PRB) at 100° C. for 2 minutes. The pre-baked films are exposed to irradiation of light under a photomask, is developed, and then is to heat-treated (FOB) at 180° C. for 30 minutes to form a 5 μm thick, 1st quantum dot composite patterned film (hereinafter, 1st layer).

Example 2: $1^{st}$ Layer/$2^{nd}$ Layer Structure

A layered structure is obtained in the same manner as in Example 1, except that a first layer is formed on the glass substrate and a second layer is formed on the first layer.

Comparative Example 1

A single layer film is obtained in substantially the same manner as in Example 1 except that the first layer is not formed on the second layer.

Comparative Example 2

A single layer film is obtained in substantially the same manner as in Example 1 except that the first layer is formed on the glass substrate and the second layer is not formed.

For each of the structures (i.e., the color filter) obtained in Example 1, Example 2, Comparative Example 1, and Comparative Example 2, an incident light of a wavelength 465 nm is provided and the luminescent properties are measured and the results are shown in Table 1.

TABLE 1

| | Layered structure (thickness) | Photo-conversion | Absorption (%) and fwhm (nm) | Photo-conversion efficiency (C.E.) | PL tail (>580 nm) | 80° C. Photo-conversion | 80° C. C.E. |
|---|---|---|---|---|---|---|---|
| Example 1 | 2nd layer (5 μm)/ 1st layer (5 μm) lamination | 33% or greater | greater than 88% 39 nm | 31.2% | 15% or less | 31.3% | greater than 35% |
| Example 2 | 1st layer (5 μm)/ 2nd layer (5 μm) lamination | about 33% | greater than 88% 40 nm | 30.2% | 17.6% | 30.3% | 34.2% |
| Comp. Example 1 | 2nd layer (10 μm) | 33% or greater | greater than 88% 43 nm | 31.2% | greater than 20% | 31.2% | 33.1% |
| Comp. Example 2 | 1st layer (10 μm) | less than 30% | 76% 35 nm | 28.4% | 15% or less | 28.4% | greater than 35% |

Referring to Table 1, the color filter of the Examples may exhibit improved luminescent properties and stabilities over the color filters of the Comparative Examples.

Examples 3 to 4

A color filter is prepared in the same manner as set forth in Example 1, except for the thickness of the second layer and the first layer is changed into 7.5 μm: 2.5 μm (Example 3), and 2.5 μm: 7.5 μm (Example 4), respectively.

For each of the structures (i.e., the color filter) obtained in Example 3, Example 4, an incident light of a wavelength 465 nm is provided and the luminescent properties are measured and the results are shown in Table 2.

TABLE 2

| | 2nd layer:1st layer (thickness) | Photo-conversion | Absorption and FWHM | Photo-conversion efficiency C.E. | PL tail (>580 nm) | 80° C. photo-conversion | 80° C. CE |
|---|---|---|---|---|---|---|---|
| Example 3 | 7.5 μm:2.5 μm | 33.7% | 91.5% 41 nm | 36.8% | 17.5% | 30.9% | 33.7% |
| Example 4 | 2.5 μm:7.5 μm | 33.4% | 87% 36.4 nm | 38.5% | 13.2% | 31.7% | 36.5% |

Referring to Tables 1 and 2, the color filter of the Examples may exhibit improved luminescent properties and stabilities over the color filters of the Comparative Examples.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

Description of Symbols

10: color filter
20: a first layer
21: first quantum dots
30: second layer
31: second quantum dots
40: light source

What is claimed is:

1. A color filter comprising
a first pixel that is configured to emit a green light, wherein the first pixel comprises a light emitting layer,
wherein the light emitting layer comprises a first layer comprising first quantum dots, and a second layer comprising second quantum dots different from the first quantum dots,
wherein the second layer is disposed on the first layer,
wherein a quantum yield of the first quantum dots is greater than a quantum yield of the second quantum dots,
wherein an absorption of blue light of the second quantum dots is greater than an absorption of the blue light of the first quantum dots,
wherein an average size of the quantum dots is greater than or equal to about 5 nanometers and less than or equal to about 10 nanometers, and an average size of the second quantum dots is greater than or equal to about 2 nanometers and less than or equal to about 8 nanometers,
wherein the first quantum dots and the second quantum dots exhibit a maximum luminescent peak in a range of a green light wavelength,
wherein the first quantum dots comprise a semiconductor nanocrystal core comprising indium, phosphorus, and optionally zinc, a first semiconductor nanocrystal shell disposed on the semiconductor nanocrystal core of the first quantum dots, the first semiconductor nanocrystal shell of the first quantum dots comprising zinc and selenium, and a second semiconductor nanocrystal shell disposed on the first semiconductor nanocrystal shell of the first quantum dots, the second semiconductor nanocrystal shell of the first quantum dots comprising zinc and sulfur, and
wherein the second quantum dots comprise a semiconductor nanocrystal core comprising indium, phosphorus, and optionally zinc, a first semiconductor nanocrystal shell disposed on the semiconductor nanocrystal core of the second quantum dots, the first semiconductor nanocrystal shell of the second quantum dots comprising zinc, selenium, and sulfur, and a second semiconductor nanocrystal shell disposed on the first semiconductor nanocrystal shell of the second quantum dots, the second semiconductor nanocrystal shell of the second quantum dots comprising zinc and sulfur.

2. The color filter of claim 1, wherein the quantum yield of the first quantum dots is greater than or equal to about 80% and less than or equal to 100%, and the quantum yield of the first quantum dots is greater than the quantum yield of the second quantum dots by from about 1% to about 10%.

3. The color filter of claim 1, wherein the absorption of the blue light of the second quantum dots is greater than or equal to about 82% and the absorption of the blue light of the second quantum dots is greater than the absorption of the blue light of the first quantum dots by from about 1% to about 10%.

4. The color filter of claim 1, wherein the green light wavelength is greater than or equal to about 500 nanometer and less than or equal to about 560 nanometers.

5. The color filter of claim 4, wherein a photoluminescent peak of the first quantum dots has a full width at half maximum that is narrower than a photoluminescent peak of the second quantum dots, or
wherein the first quantum dots exhibit a tail emission area percentage that is smaller than a tail emission area percentage of the second quantum dots.

6. The color filter of claim 1, wherein a full width at half maximum of a photoluminescent peak of the first quantum dots is less than or equal to about 43 nanometers.

7. The color filter of claim 1, wherein the first quantum dots or the light emitting layer have a tail emission area percentage in a photoluminescent peak of less than or equal to about 20%.

8. The color filter of claim 1, wherein a difference between a photoluminescent peak wavelength of the first quantum dots and a photoluminescent peak wavelength of the second quantum dots is greater than or equal to about 10 nanometers and less than or equal to about 30 nanometers.

9. The color filter of claim 1, wherein a difference between a first absorption peak wavelength of the first quantum dots and a first absorption peak wavelength of the second quantum dots is greater than or equal to about 10 nanometers and less than or equal to about 30 nanometers.

10. The color filter of claim 1, wherein the first quantum dots are configured to exhibit a photoluminescent peak wavelength of from about 500 nanometers to about 550 nanometers and a first absorption peak wavelength of the first quantum dots is from about 470 nanometers to about 530 nanometers, and wherein the second quantum dots are configured to exhibit a photoluminescent peak wavelength of from about 480 nanometers to about 530 nanometers and a first absorption peak wavelength of the second quantum dots is from about 450 nanometers to about 500 nanometers.

11. The color filter of claim 1, wherein the first quantum dots have an average particle size that is greater than an average particle size of the second quantum dots by greater than or equal to about 1 nanometer.

12. The color filter of claim 1, wherein an average size of the first quantum dots is greater than or equal to about 4.5 nanometers and less than or equal to about 7 nanometers, and wherein an average size of the second quantum dots is greater than or equal to about 3.5 nanometers and less than or equal to about 5 nanometers.

13. The color filter of claim 1, wherein each of the first layer and the second layer comprises each of the first quantum dots and the second quantum dots, and wherein the first layer comprises more of the first quantum dots than the second quantum dots, and the second layer comprises more of the second quantum dots than the first quantum dots.

14. The color filter of claim 13, wherein in a direction from the first layer toward the second layer, an amount of the first quantum dots decreases and an amount of the second quantum dots increases.

15. The color filter of claim 1, wherein in an ultraviolet-visible absorption spectrum, the light emitting layer exhibits an upward slope at a wavelength at 450 nanometers.

16. A display device comprising
a light source, and
the color filter of claim 1.

17. The display device of claim 16, wherein the color filter is disposed with the first layer facing the light source.

* * * * *